(12) United States Patent
Ueda et al.

(10) Patent No.: US 8,788,844 B2
(45) Date of Patent: Jul. 22, 2014

(54) INFORMATION PROCESSING APPARATUS, INFORMATION PROCESSING SYSTEM AND INFORMATION PROCESSING METHOD, AND PROGRAM

(75) Inventors: Kenjiro Ueda, Kanagawa (JP); Kazuo Yamamoto, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/515,188

(22) PCT Filed: Nov. 11, 2010

(86) PCT No.: PCT/JP2010/070103
§ 371 (c)(1),
(2), (4) Date: Jun. 11, 2012

(87) PCT Pub. No.: WO2011/074358
PCT Pub. Date: Jun. 23, 2011

(65) Prior Publication Data
US 2012/0272070 A1    Oct. 25, 2012

(30) Foreign Application Priority Data

Dec. 18, 2009  (JP) .................................. 2009-288019

(51) Int. Cl.
*G06F 11/30* (2006.01)
*G06F 12/14* (2006.01)

(52) U.S. Cl.
USPC ........................................................ 713/189

(58) Field of Classification Search
USPC ........................................................ 713/189
See application file for complete search history.

(56) References Cited

U.S. PATENT DOCUMENTS

| | | | | |
|---|---|---|---|---|
| 2006/0059253 | A1* | 3/2006 | Goodman et al. | 709/223 |
| 2007/0050849 | A1* | 3/2007 | Takashima | 726/26 |
| 2007/0065101 | A1* | 3/2007 | Takashima | 386/94 |
| 2007/0116280 | A1* | 5/2007 | Takashima | 380/228 |
| 2007/0159648 | A1* | 7/2007 | Takashima | 358/1.14 |
| 2007/0186110 | A1* | 8/2007 | Takashima | 713/173 |
| 2008/0210747 | A1* | 9/2008 | Takashima | 235/375 |

FOREIGN PATENT DOCUMENTS

| | | |
|---|---|---|
| JP | 2001-332019 | 11/2001 |
| JP | 2002-025182 | 1/2002 |
| JP | 4140624 | 3/2007 |
| JP | 2008-84145 | 4/2008 |
| JP | 2008-98765 | 4/2008 |

* cited by examiner

*Primary Examiner* — Kambiz Zand
*Assistant Examiner* — Stephen Sanders
(74) *Attorney, Agent, or Firm* — Finnegan Henderson Farabow Garrett & Dunner LLP

(57) ABSTRACT

An apparatus and method configured to identify the type of a content to be copied and perform a copying process in a sequence according to the result of identification is provided. In an information processing apparatus configured to perform the copying process for copying recorded data in an information recording medium to other media or the like, the type of the data recorded in the recording medium of a copy source is identified. More specifically, whether the type of the content to be copied is either a reproduction-pass-specific content which sets a reproduction pass corresponding to the information processing apparatus and causes the information processing apparatus to execute the reproduction according to the reproduction pass, or a content-code-applied content which verifies the reproduction sequence to be executed in the reproducing apparatus and verifies whether the reproduction process is executed according to the correct reproduction sequence is discriminated, and an optimal sequence is applied on the basis of the result of discrimination, whereby the copying process is executed. In this configuration, a reliable copying process on the basis of the optimal process according to various data types is realized.

12 Claims, 17 Drawing Sheets

| INDEX | CONTENT MANAGEMENT UNIT (CPS) | UNIT KEY (CPS UNIT KEY) |
|---|---|---|
| TITLE 1 | CPS1 | Ku1 |
| TITLE 2 | CPS2 | Ku2 |
| TITLE 3 | CPS3 | Ku3 |
| . | . | . |
| . | . | . |
| . | . | . |
| TITLEn | CPSn | Kun |

FIG.1

| INDEX | CONTENT MANAGEMENT UNIT (CPS) | UNIT KEY (CPS UNIT KEY) |
|---|---|---|
| TITLE 1 | CPS1 | Ku1 |
| TITLE 2 | CPS2 | Ku2 |
| TITLE3 | CPS3 | Ku3 |
| . . | . . | . . |
| TITLEn | CPSn | Kun |

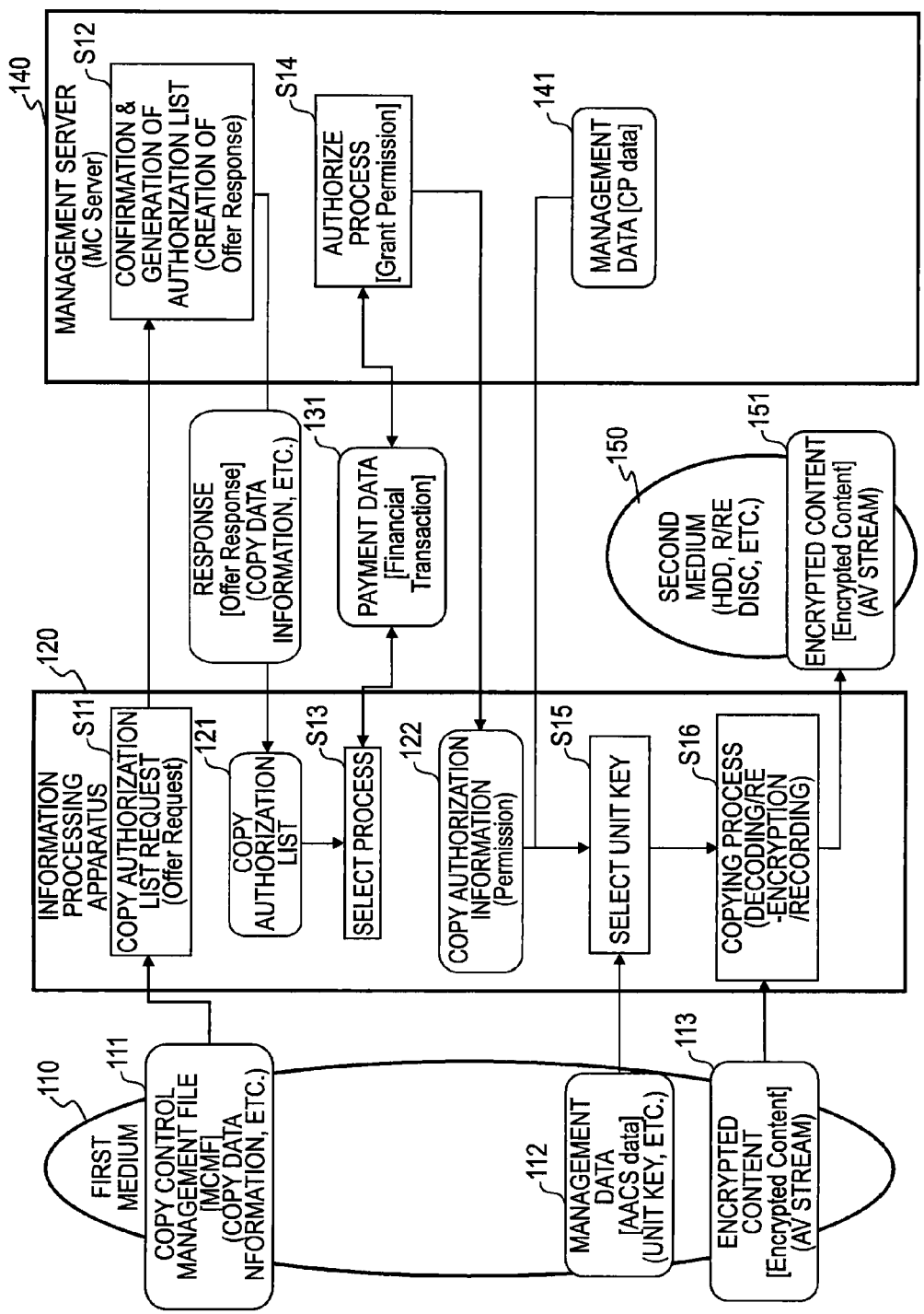

FIG.3

```
COPY DATA INFORMATION (dealManifest)

?   <MCUALL>
?     <DirectoryName>BDMV</DirectoryName>
?   </MCUALL>
?   <MCUPARTIAL ID="0x0001">
?     <FileName>BDMV/PLAYLIST/00000.mpls</FileName>
?     <FileName>BDMV/CLIPINF/00000.clpi</FileName>
?     <FileName>BDMV/STREAM/00000.m2ts</FileName>
?     <FileName>BDMV/BDJO/00000.bdjo</FileName>
?     <FileName>BDMV/JAR/00000.jar</FileName>
?     <FileName dest="BDMV/index.bdmv">PARTIALDB/index.bdmv</FileName>
?     <FileName
       dest="BDMV/MovieObject.bdmv">PARTIALDB/MovieObject.bdmv</FileName>
?     <description lang="eng" text="Lion" />
?     <description lang="deu" text="Lowe" />
?   </MCUPARTIAL>
```

171 { MCUALL section }
172 { MCUPARTIAL section }

FIG.5

```
COPY DATA INFORMATION (dealManifest)

201 {
    ? <MCUALL>
    ?     <DirectoryName>BDMV</DirectoryName>
    ? </MCUALL>

202 {
    ? <MCUPARTIAL ID="0x0001">
    ?     <FileName>BDMV/PLAYLIST/00000.mpls</FileName>
    ?     <FileName>BDMV/CLIPINF/00000.clpi</FileName>
    ?     <FileName>BDMV/STREAM/00000.m2ts</FileName>
    ?     <FileName>BDMV/BDJO/00000.bdjo</FileName>
    ?     <FileName>BDMV/JAR/00000.jar</FileName>
    ?     <FileName dest="BDMV/index.bdmv">PARTIALDB/index.bdmv</FileName>
    ?     <FileName dest="BDMV/MovieObject.bdmv">PARTIALDB/MovieObject.bdmv</FileName>
    ?     <description lang="eng" text="Lion" />
    ?     <description lang="deu" text="Lowe" />
    ?     <title_id>012ab001=TITLE 1
    ?     <title_id>2812ca21=TITLE 2        203 TITLE INFORMATION
    ?     <title_id>234de085=TITLE 3
    ?     ..
    ? </MCUPARTIAL>
```

FIG.9

```
COPY DATA INFORMATION (dealManifest)

?   <MCUALL>
?     <DirectoryName>BDMV</DirectoryName>         } 301
?   </MCUALL>
?   <MCUPARTIAL ID="0x0001">
?     <FileName>BDMV/PLAYLIST/00000.mpls</FileName>
?     <FileName dest="BDMV/index.bdmv">PARTIALDB/index.bdmv</FileName>
?     <FileName dest="BDMV/MovieObject.bdmv">PARTIALDB/MovieObject.bdmv</FileName>
?     <description lang="eng" text="Lion" />
?     <description lang="deu" text="Lowe" />
?     <title_id>012ab001=TITLE 1  ⎫
?     <title_id>2812ca21=TITLE 2   ⎬ 303 TITLE INFORMATION
?     <title_id>234de085=TITLE 3  ⎭
      :
?   </MCUPARTIAL>
                                                    } 302
```

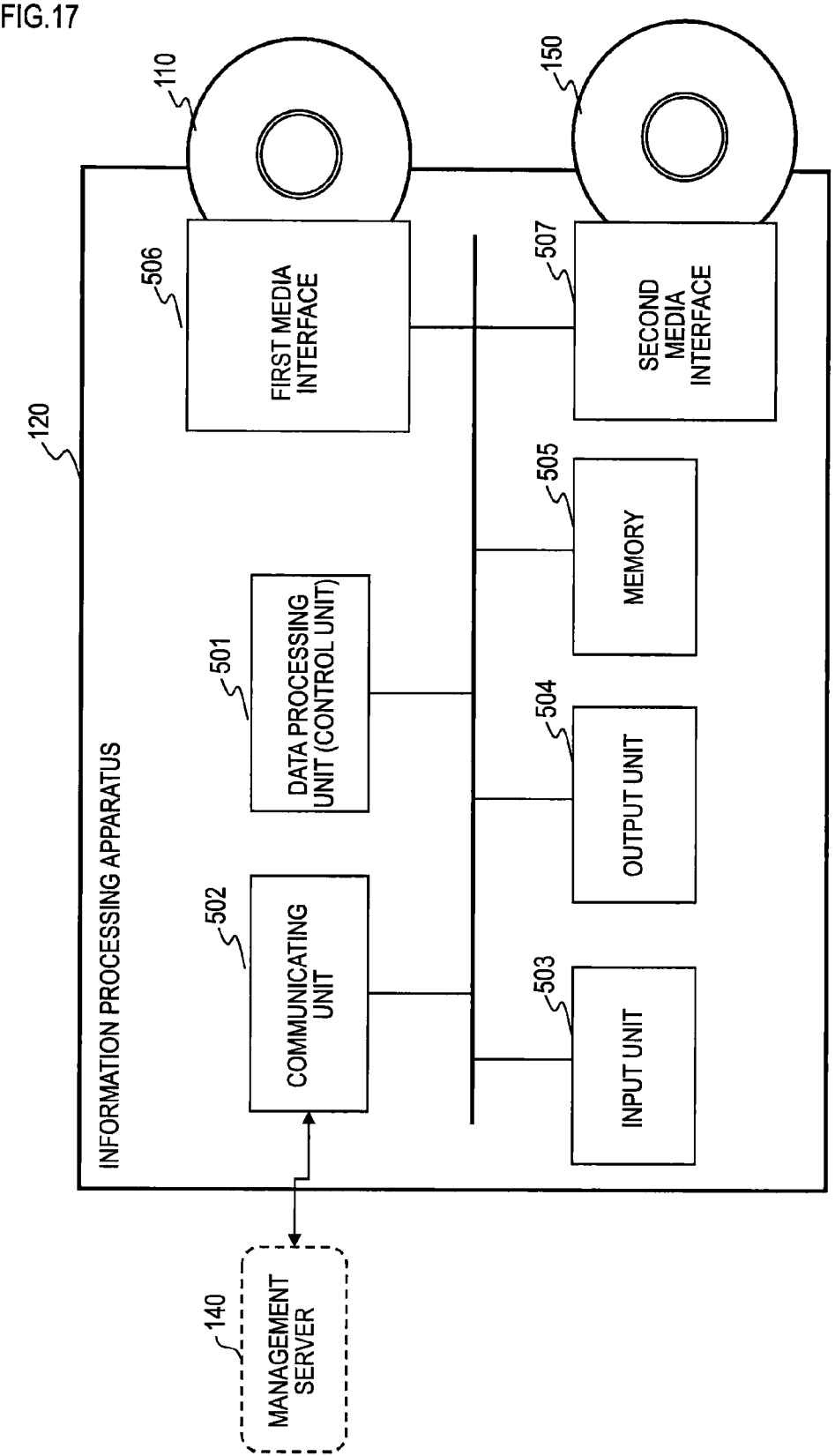

INFORMATION PROCESSING APPARATUS, INFORMATION PROCESSING SYSTEM AND INFORMATION PROCESSING METHOD, AND PROGRAM

TECHNICAL FIELD

The present invention relates to an information processing apparatus, an information processing system and an information processing method, and a program. More specifically, the invention relates to an information processing apparatus, an information processing system and an information processing method, and a program for copying data recorded in media (information recording media) such as discs under a predetermined management.

BACKGROUND ART

Recently, DVDs (Digital Versatile Discs), BD (Blu-ray Discs (registered trademark)), or the like are widely used as information recording media (media) of various contents such as movies or music. Many of the contents such as music data and image data recorded in these information recording media are copyrighted or distribution-righted by creator or sellers thereof. Therefore, even the users who have purchased the disc, usage of the disc-recorded contents are limited to a certain extent. For example, copying a disc-recorded content to media such as other discs unlimitedly is not allowed.

Examples of a copy management configuration of the media-recorded contents as described above include a configuration of copy authorization process subject to reception of copy authorization information from a management server. More specifically, the process is performed in the following sequence.

A user loads a medium such as a content-stored disc in a user's apparatus such as a PC or a recording and reproducing apparatus, and the user's apparatus is connected to a management server via a network. Subsequently, the user's apparatus transmits prescribed information such as disc identifier (ID) to the server. The server verifies the validity or the like of the received information, and transmits copy authorization information to the user's apparatus. The user's apparatus is configured to be allowed to start a copying process under the condition of reception of the copy authorization information from the server.

Such a copy management configuration is referred to as Managed Copy (MC) and is disclosed in detail in Patent Document 1 (JP-A-2008-98765), for example.

In contrast, as a standard relating to a copyright protecting technology of the contents, there is an AACS (Advanced Access Content System) standard. Many of the disc-recorded contents such as the BD complying with an AACS standard are recorded as encrypted contents. Examples of the representative encryption configuration of the AACS standard include a configuration in which the content is segmentalized into units and different encryption keys are applied thereto. By employing such the encryption configuration, content usage control on a unit to unit basis is enabled and strict and a huge variety of content usage controls are realized.

The units, which are divided units of the content are referred to as "CPS units", and encryption keys applied to an encryption process or a decoding process of the respective CPS units are referred to as CPS unit keys, unit keys, or title keys.

As regards the AACS standard, Non-patent document 1 (http://www.aacsla.com/home) or Non-patent document 2 (http://www.aacsla.com/specifications), and the like may be referenced.

When reading out the encrypted content applied with encryption keys different from one unit to another from a disc and copying the same to media such as other discs, a process of decoding the encrypted content to be copied once, and then, performing re-encryption of the decoded content complying with the standard of the management system corresponding to the media as copying destinations and recording the same is performed in many cases. In other words, the medium as a copying destination is also recorded as a usage controlled content.

In this case, if the content management system of the copy source (referred to as a first management system) and the content management system of the copy destination (referred to as a second management system) are different, processes of decoding the encrypted content of the copy source once and performing a process according to the content management system of the copy destination (second management system), for example, re-encryption using another encryption key for recording are required.

In this manner, a content copying process is required to be performed in a sequence of:

(1) reading out the encrypted content from a first medium (copy source medium);

(2) a decoding process for the encrypted content complying with the first management system compatible with the first medium (copy source medium);

(3) an encryption process for the content complying with the second management system compatible with the second medium (copy destination medium); and (4) a recording process for the encrypted content with respect to the second medium (copy destination medium).

If the recorded content in the first medium (copy source medium) is an encrypted content on a unit to unit basis as described above, performing processes of specifying the configuration units of the content, acquiring the unit keys corresponding to the specified respective units in sequence, and performing a decoding process for each of the units is required.

When the copying process is performed under the copy management on the condition that the copy authorization information is received from the above-described server, the user's apparatus needs to perform decoding by applying the unit keys on a unit to unit basis. However, there is no effective prescription for the user's apparatus to acquire information for specifying the unit. Therefore, there is a problem that the copying process for the encrypted content on a unit to unit basis cannot be executed smoothly.

Also, there are a variety of contents to be copied such as a reproduction-pass-specific content which sets a reproduction pass corresponding to the information processing apparatus and causes the apparatus to execute reproduction according to the reproduction pass.

Alternatively, there is a content-code-applied content which allows a reproduction process only after having validated a reproduction sequence to be executed in the reproducing apparatus and executed a check by applying a code (content code) for validating whether or not the reproduction process is executed according to a correct reproducing procedure.

The reproduction-pass-specific content is described in Patent Document 2 (JP-A-2008-84445), and the content-code-applied content is described in Patent Document 3 (Japanese Patent No. 4140624).

When performing a copying process for various types of contents as described above, there is a problem that a normal copying process cannot be performed if the processes adapted to the respective content types are not performed.

CITED REFERENCE

Patent Document

Patent Document 1: JP-A-2008-98765
Patent Document 2: JP-A-2008-84445
Patent Document 3: Japanese Patent No. 4140624

Non-Patent Document

Non-Patent Document 1: http://www.aacsla.com/home
Non-Patent Document 2:
  http://www.aacsla.com/specifications

SUMMARY OF INVENTION

Problems to be Solved by the Invention

In view of such circumstances, it is an object of the invention to provide an information processing apparatus, an information processing system and an information processing method, and a program which allows a quick copying process for encrypted content on a unit to unit basis and configured to realize the copying process according to various content types.

Means for Solving the Problems

A first aspect of the invention is in an information processing apparatus comprising:
  a data processing unit configured to generate copy data of data recorded in an information recording medium, wherein
    the data processing unit
    executes a data type identification process for recorded data in the information recording medium,
    discriminates whether or not the recorded data is a content-code-applied content including code information which causes a verification process for verifying a reproduction process or a conversion process for converting reproduction data to be executed at the time of data reproduction,
    executes a generation process for generating the copy data after the start of the reproduction process, if it is determined to be the content-code-applied content, and
    executes the generation process for generating the copy data without executing the reproduction process, if the recorded data is determined to be a non-content-code-applied content which does not include the code information.

Furthermore, in a mode of the information processing apparatus according to the invention, if the recorded data is determined to be the content-code-applied content, the data processing unit executes the generation process for generating the copy data after the data reproduction process according to a specified sequence has started by executing the verification process for verifying the reproduction process or the conversion process for converting the reproduction data applied with the code information.

Furthermore, in a mode of the information processing apparatus according to the invention, the data processing unit starts the generation process for generating the copy data on the condition that an instruction of execution of copying is input within a data reproduction period after the data reproduction process has started.

Furthermore, in a mode of the information processing apparatus according to the invention, the data processing unit executes a process for verifying a directory configuration of the recorded data in the information recording medium and executing the process of determining whether or not the recorded data is the content-code-applied content.

Furthermore, in a mode of the information processing apparatus according to the invention, the verification of the directory configuration is a process of confirming whether there exists a specific directory, or whether a file exists in the specific directory.

Furthermore, in a mode of the information processing apparatus according to the invention, if the recorded data in the information recording medium is determined to be data encrypted by applying individual unit keys on a unit to unit basis, the unit being segment data corresponding to individual titles in the data type identification process, the data processing unit acquires title information recorded in the copying process information acquired from the information recording medium or a management server, and acquires a unit key corresponding to the acquired title information, executes the decoding process on a unit to unit basis using the acquired unit key, and generates the copy data.

Furthermore, in a mode of the information processing apparatus according to the invention, the data processing unit discriminates whether or not the recorded data in the information recording medium is the reproduction-pass-specific content for performing the reproduction according to the reproduction pass selected corresponding to the information processing apparatus in the data type identification process, and if the recorded data is determined to be the reproduction-pass-specific content, generates a segment key applied for decoding part of a configuration data of the reproduction pass and generates the copy data by the decoding process using the generated segment key and the unit key.

Furthermore, in a mode of the information processing apparatus according to the invention, the data processing unit acquires identification information for identifying a play list which allows reproduction according to the reproduction pass by a process applying a sequence key stored in a memory of the information processing apparatus to a sequence key block reproduced from the information recording medium, reads out a play list file corresponding to the reproduction pass by applying the acquired identification information from the information recording medium and executes the data reading according to the reproduction pass by applying the play list.

Furthermore, in a mode of the information processing apparatus according to the invention, the data processing unit acquires a classification number by a process using the sequence key stored in the memory of the information processing apparatus with respect to the sequence key block reproduced from the information recording medium, acquires identification information for identifying the play list using the classification number, and acquires a segment key corresponding to a specific variation in the segment from a segment key file including an encryption key obtained by encrypting the key for decoding the data according to the reproduction pass.

Furthermore, a second aspect of the invention is in an information processing system comprising:
  an information processing apparatus configured to generate copy data of data recorded in an information recording medium; and
  a management server configured to provide copy authorization information with respect to the information processing apparatus, wherein the information recording medium is configured to record data encrypted by applying individual unit keys on a unit to unit basis, the unit being segment data corresponding to individual titles, the management server provides copying process information in which the identification information of the title is recorded to the information processing apparatus according to the request from the information processing apparatus, the information processing apparatus executes a data type identification process for recorded data in the information recording medium, if the recorded data is determined to be data encrypted by applying individual unit keys on a unit to unit basis, the unit being segment data corresponding to individual titles, acquires title information recorded in the copying process information acquired from the management server, and acquires a unit key corresponding to the acquired title information, executes the decoding process on a unit to unit basis using the acquired unit key, and generates the copy data.

Furthermore, a third aspect of the invention is in an information processing method configured to generate copy data of data recorded in an information recording medium in an information processing apparatus, wherein a data processing unit of the information processing apparatus executes a data type identification process for recorded data in the information recording medium, discriminates whether or not the recorded data is a content-code-applied content including code information which causes a verification process for verifying a reproduction process or a conversion process for converting reproduction data to be executed at the time of data reproduction and, executes a generation process for generating the copy data after the start of the reproduction process, if it is determined to be the content-code-applied content, and executes the generation process for generating the copy data without executing the reproduction process, if the recorded data is determined to be a non-content-code-applied content which does not include the code information.

Furthermore, a fourth aspect of the invention is in a program configured to generate copy data of data recorded in an information recording medium in an information processing apparatus, the program causing a data processing unit of the information processing apparatus to execute a step of executing a data type identification process for recorded data in the information recording medium, a step of discriminating whether or not the recorded data is a content-code-applied content including code information which causes a verification process for verifying a reproduction process or a conversion process for converting reproducing data to be executed at the time of data reproduction, a step of executing a generation process for generating the copy data after the start of the reproduction process if it is determined to be the content-code-applied content, and a step of executing the generation process for generating the copy data without executing the reproduction process if the recorded data is determined to be a non-content-code-applied content which does not include the code information.

For example, the program according to the invention is a program which can be provided for information processing apparatuses or computer systems which are capable of executing various program and codes by recording medium or communication medium configured to provide the programs in a computer readable format. By providing such programs in a computer readable format, the process according to the program is realized on the information processing apparatuses or the computer systems.

Other objects, characteristics, and advantages of the invention will be apparent by further detailed description with reference to embodiment of the invention described later or attached drawings. For reference, in this specification, the term "system" means a logical aggregate configuration of a plurality of apparatuses, and the apparatuses having the respective configurations are not necessarily in the same casing.

Advantages of the Invention

According to the configuration of an embodiment of the invention, in the information processing apparatus which performs the copying process for copying the recorded data in the information recording medium to other media or the like, the type of the data recorded in the recording medium of the copy source is identified. More specifically, whether the type of the content to be copied is either the content to be copied is a reproduction-pass-specific content which sets a reproduction pass corresponding to the information processing apparatus and causes the information processing apparatus to execute the reproduction according to the reproduction pass, or a content-code-applied content which verifies the reproduction sequence to be executed in the reproducing apparatus and verifies whether the reproduction process is executed according to the correct reproduction sequence is discriminated, and an optimal sequence is applied on the basis of the result of discrimination, whereby the copying process is executed. In this configuration, a reliable copying process on the basis of the optimal process according to various data types is realized.

BRIEF DESCRIPTION OF THE DRAWINGS

FIG. 1 is an explanatory drawing showing a unit configuration and a unit key management table.

FIG. 2 is an explanatory drawing showing a sequence of a copying process on the basis of management by a management server (MC (Managed Copy)).

FIG. 3 is an explanatory drawing showing a basic configuration of copying process information (dealManifest).

FIG. 5 is an explanatory drawing showing a configuration of copying process information (dealManifest) according to an embodiment of the invention.

FIG. 9 is an explanatory drawing showing a configuration of the copying process information (dealManifest) according to the embodiment of the invention.

FIG. 17 is an explanatory drawing showing an example of a configuration of an information processing apparatus.

BEST MODES FOR CARRYING OUT THE INVENTION

Figure 4:
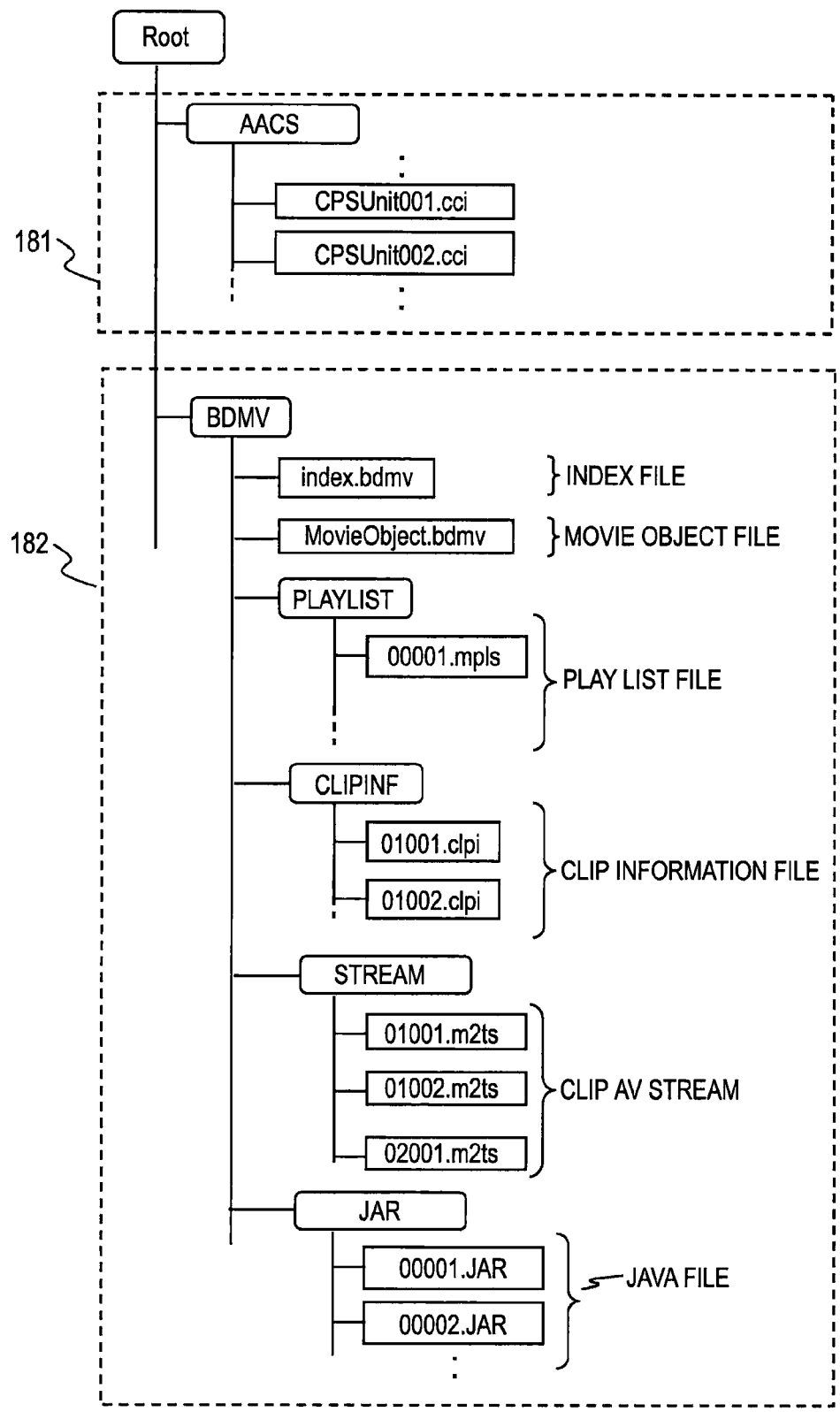
FIG. 4 is an explanatory drawing showing an example of a directory configuration of a medium.

Referring now to the drawings, detailed description of an information processing apparatus, an information processing system and an information processing method, and a program of the invention will be given. The description will be given according to the following contents.

1. Outline of an encryption configuration of a content and Managed Copy (MC)

2. An example of a basic configuration of current copying process information (dealManifest)

3. A configuration of copying process information (dealManifest) proposed in the invention 4. A countermeasure for a reproduction-pass-specific content 5. A countermeasure for a reproduction content using a content code 6. An embodiment in which a copying process is executed by discriminating data types of a copy source 7. An example of a configuration of an information processing apparatus

[1. Outline of an Encryption Configuration of a Content and Managed Copy (MC)]

First of all, an outline of an encryption configuration of a recorded content in an information recording medium (medium) and Managed Copy (MC) will be described.

Many contents such as movies recorded in general content-recorded discs, for example, the BD (Blu-ray Disc (registered trademark)) or the like are recorded in a state of being encrypted in order to prevent unfair use such as unfair copying.

The encrypted content complying with an AACS (Advanced Access Content System) standard which is a standard relating to a copyright protecting technology of a content is segmentalized into units as described above, and recorded as encrypted data applied with encryption keys different from unit to unit. With the encryption configuration on a unit to unit basis, the usage control on a unit to unit basis are enabled, so that strict and a huge variety of content usage controls are realized.

The units, which are divided units of content are referred to as "content management unit" or "CPS units", and encryption keys corresponding to the respective CPS units are referred to as CPS unit keys, unit keys, or title keys. An example of a correspondence relation between the unit division and the encryption keys (unit keys) of the content recorded in the disc is shown in FIG. 1.

FIG. 1 is an example of a unit key management table showing a correspondence relationship between the units which constitute a content recorded in a certain medium, for example, a single disc (CPS units) and the CPS unit keys as encryption keys. The unit key management table is recorded in a medium (a BD or the like) together with the encrypted content.

As shown in FIG. 1, the CPS units as configuration data of the content are segmentalized into CPS units 1 to n. CPS unit keys as unique encryption keys are associated with each of the CPS units 1 to n.

For example, when reproducing the CPS unit 1 (CPS1), decoding is performed using a CPS unit key 1 (Ku1). When reproducing the CPS unit 2 (CPS2), performing a process of decoding by applying a CPS unit key 2 (Ku2) is required. As indices corresponding to the respective CPS units and the CPS unit keys, for example, "titles" are used. The "titles" are indices set corresponding to the respective CPS units, and the CPS unit and the CPS unit key can be specified by specifying the title.

Referring now to FIG. 2, an outline of the managed copy (MC) that the ARCS prescribes as a copy control configuration of a content recorded in the information recording medium (medium) will be described with reference to FIG. 2.

In FIG. 2, from the left, a first medium 110 such as an ROM disc having a content such as a movie recorded therein, an information processing apparatus 120 as a user's apparatus configured to perform a process of reading out data such as a content from the first medium 110 and copying a second medium 150 (copy destination medium) composed of an HDD or an R/RE disc which is a data recordable medium, the second medium 150, which is a medium as a copy destination of the content, and is composed of an HDD, an R/RE type disc, and, in addition, a management server (MC server) 140 configured to execute a process of providing authorization information of a content copying process and management data, are shown.

The information processing apparatus 120 is composed of, for example, a PC or a recording reproduction apparatus, and configured to perform a process of inputting read data from the first medium 110 and recording the data in the second medium 150 as a copy destination media composed of an HDD or an R/RE disc.

The second medium 150 is a data writable medium and, more specifically, a hard disc (HDD) or an R-type or RE-type Blu-ray Disc (registered trademark), a DVD disc and the like.

For example, an encrypted content 113 as a usage control content is recorded in the first medium 110 composed of, for example, an ROM disc or the like as shown in the drawing. The encrypted content 113 is a content including an AV (Audio Visual) stream of moving image contents such as HD (High Definition) movie contents as high-resolution moving image data, or music data, game programs, image files, voice data, and text data. The encrypted content 113 is, as described with reference to FIG. 1, encrypted date by applying individual unit keys on a unit to unit basis as segment data corresponding to the individual titles.

Furthermore, stored in the first medium 110 are management data (AACS Data) 112 including key information applied for decoding the encrypted content and usage control information and, in addition, a copy control management file (MCMF: Managed Copy Manifest File) 111 used for the time of copying process of the recorded contents in the first medium 110.

The encrypted content 113 has the usage management configuration on a content management unit (CPS unit) to content management unit (CPS unit) basis, as described above with reference to FIG. 1, and is an encrypted content which is encrypted by applying unit keys (CPS unit keys) different from one CPS unit to another. In other words, in order to realize the usage controls different from segment data to segment data on a unit to unit basis, encryption is made by keys (referred to as CPS unit keys, unit keys, or title keys) different from unit to unit.

The management data 112 shown as recording information of the first medium 110 shown in FIG. 2 is management data prescribed by the AACS (Advanced Access Content System), which is a standard management system relating to, for example, a copyright protecting technology of contents, and is data including a CPS unit key file having a key (unit key) for applying to the decoding of the encrypted content 113 stored therein, license information, Content Certificate (CC) proving correctness of the contents and, in addition, an encryption key block including media keys for acquiring the CPS unit keys stored therein (MKB (Media Key Block)).

The MKB (Media Key Block) will be described in brief. The MKB is an encryption key block to be generated on the basis of a tree-structure key delivery system known as a mode of a broadcasting encryption system. The MKB is a key information block which allows acquisition of a media key [Km], which is a key required for decoding the content, only by the process (decoding) on the basis of a device key [Kd] stored in the information processing apparatus of a user who has an effective license. This is a system applied with an information delivery system according to so-called a hierarchical tree structure, which allows acquisition of the media key [Km] only when the user's apparatus (information processing apparatus) has an effective license, and does not allow the acquisition of the media key {Km} in the user's apparatus which is invalidated (subjected to a revoke process). In a memory of the information processing apparatus 120 shown in FIG. 2, the device keys [Kd] are stored.

The copy control management file (MCMF: Managed Copy Manifest File) 111 shown as the recorded information in the first medium 110 in FIG. 2 is a file to be applied when executing the copying process for the content 113 recorded in the first medium 110 and, for example, is an XML descriptive data including following information.

(a) Content ID: An identifier (ID) uniquely showing a recorded content in the first medium 110, for example, an ISAN number as the content code information is used.

(b) URI (URL): Information for connecting the management server for giving a copying authorization when executing the content copy or executing generation of tokens by a binding process, and is access information with respect to the management server 140 in the configuration shown in FIG. 2.

(c) Copying process Information (dealManifest): Information relating to data which allows copying process and includes, for example, information relating to file names to be copied.

Referring now to FIG. 2, a process sequence when copying the encrypted content 113 recorded in the first medium 110, which is an ROM disc for example, to another medium such as the second medium 150 composed of a hard disc or an R/RE disc will be described.

First of all, in Step S11, the information processing apparatus 120 transmits a copy authorization list request (Offer Request) to the management server 140 by applying the server information (URI or the like) recorded in the copy control management file (MCMF) 111 recorded in the first medium 110.

At this time, the content ID or the like corresponding to the content to be subject to the copying process is transmitted to the management server 140.

In Step S12, the management server 140 executes a verification process for correctness of received information such as the content ID received from the information processing apparatus 120 and, if it is verified not to have any problem, generates a copy authorization list (Offer List) 121 and transmits the same to the information processing apparatus 120. For example, it is a list including information such as a list of files which is allowed to be copied.

The copy authorization list (Offer List) 121 provided by the management server 140 includes the same data as the copying process information (dealManifest) in (c) described above recorded in the copy control management file (MCMF) 111 recorded in the first medium 110.

The information processing apparatus 120 displays the copy authorization list (Offer List) 121 received from the management server 140 on a display. In Step S13, when the user executes the selection of the process for specifying the content to be copied or the like, the information processing apparatus 120 executes a payment process along with the copying process with the management server 140. More specifically, a transfer process or the like of payment data 131 is performed between the information processing apparatus 120 and the management server 140. In Step S14, if the management server 140 authorizes the copying process, copy authorization information 122 is sent to the information processing apparatus 120.

The information processing apparatus 120 goes to the content copying process under the condition of reception of the copy authorization information 122 from the management server 140. Firstly, in Step S15, the management data 112 is acquired from the first medium 110, a unit key included in the management data 112 is acquired, and a unit key corresponding to the data to be copied is selected.

In Step S16, the encrypted content 113 is read out from the first medium 110, the decoding process is performed by selecting the data to be copied, and data copying is executed with respect to the second medium 150 composed of an HDD or an R/RE disc as a copy destination.

For reference, the copying process in Step S16 includes following processes and required to be performed in a sequence of (1) Reading out of the encrypted content from the first medium 110 (copy source medium), (2) decoding process of the encrypted content complying with the first management system compatible with the first medium 110 (copy source medium), (3) encryption process of the content complying with the second management system compatible with the second medium 150 (copy destination medium), and (4) recording process with respect to the second medium 150 (copy destination medium) of the encrypted content.

The decoding process for the encrypted content complying with the first management system in (2) described above is performed as a decoding process on a CPS unit to CPS unit basis applied with the CPS unit key if the first management system is a system complying with the AACS standard.

For reference, the second management system compatible with the copy destination medium (second medium 150) is a management system compatible with various standards according to the medium, which may be the AACS, or CPRM, Magic Gate, VCPS, and the like.

[2. An Example of a Basic Configuration of Copying Process Information (dealManifest)]

In the copy management configuration under the condition of reception of the copy authorization information from the above-described server, the information processing apparatus 120 is capable of specifying the data to be copied by using the copying process information (dealManifest) included in the copy authorization list 121 received from the management server 140. For example, the object to be copied can be specified on a file to file basis.

However, as described above, if the encryption process on a unit to unit basis is applied to the encrypted content 113 stored in the disc 110, since one file does not necessarily correspond to one unit, specification of the unit or specification of the unit key cannot be achieved even when the file is specified. When performing the copying process, the information processing apparatus 120 is required to specify the unit which constitutes the data to be copied and, in addition, acquire the unit key corresponding to the unit, and perform the decoding process on a unit to unit basis.

If the information processing apparatus 120 is capable of obtaining the information to specify the unit to be copied, acquisition of the unit key is enabled by using the unit specification information. However, in the current state, effective means for obtaining such information does not exist. Therefore, as regards the encrypted contents on a unit to unit basis, it is difficult to perform a quick copying under the content management system under the condition of the reception of the copy authorization information.

The AACS which manages the content copyright proposes to provide copying process information (dealManifest) to the user's apparatus from the management server when executing the managed copy (MC: Managed Copy) which prescripts the content copying process under the management by the server, and to use the copying process information (dealManifest) to cause the user's apparatus to perform the copying process efficiently.

An example of a basic configuration of the copying process information (dealManifest)proposed by the AACS is shown in FIG. 3.

The copying process information (dealManifest) is included in the copy authorization list 121 provided by the management server 140 shown in FIG. 2 to the information processing apparatus 120.

The copying process information (dealManifest) is data also included in the copy control management file (MCMF) 111 stored in the first medium 110.

As shown in FIG. 3, the copying process information (deal-Manifest) is XML descriptive data including following two items of information.

(a) First information 171 [MCUALL] for executing the copying process of files in the entire directory as objects to be copied.

(b) Second information 172 [MCUPARTIAL] for executing the copying process of individual files set in the directory as objects to be copied.

The information processing apparatus 120 presents information relating to the content to be copied on the display on the basis of the XML descriptive data shown in FIG. 3. The user is allowed to select the content to be copied on the basis of the presented information.

The first information 171 [MCUALL] is information used for copying all the files from the directory corresponding to the content to be recorded in the BD (BDMV directory) on down together, and a directory name [BDMV] is recorded.

This information is information set which allows the information processing apparatus 120 which performs the copying process to select a directory corresponding to the directory name [BDMV] from various data recorded in the first medium 110 and copy data from the directory as a job lot.

Also, the second information 172 [MCUPARTIAL] is information used for selecting individual files set in the directory from the above-described directory [BDMV] on down and execute copying, and the information on the file names set in the directory from the above-described directory [BDMV] on down is recorded.

For reference, for example, the directory corresponding to the recorded data for the BD has a configuration shown in FIG. 4. The directory is separated into a management information setting unit 181 (AACS directory) and a data unit 182 (BDMV directory) as shown in FIG. 4.

A CPS unit key file or a usage control information file is stored in the management information setting unit 181 (AACS directory).

In contrast, in the data unit 182, for example, files such as
an index file,
a play list file,
a clip information file,
a clip AV stream file, and
a JAR file
are recorded in directories from the BDMV directory on down.

Stored in the index file is title information as index information to be applied to the reproduction process. These titles are the same as the titles registered in the unit key management table described above with reference to FIG. 1, and are data associated with the CPS units.

The play list file is a file in which the order of reproduction of the contents or the like is prescribed according to the program information of the reproduction program specified by the title, and includes master-disciple information relating to the clip information having reproducing position information.

The clip information file is a file specified by the play list file, and includes reproducing position information or the like of the clip AV stream file.

The clip AV stream file is a file in which AV stream data to be reproduced is stored.

The JAR file is a file in which JAVA (registered trademark) programs, commands, and the like are stored.

The sequence that the information processing apparatus reproduces contents recorded in the information recording medium is as follows.

First of all, a specific title is specified from an index file by a reproduction application.

A reproduction program associated with the specified title is selected.

A play list in which the order of reproduction of the contents or the like is prescribed according to the program information of the selected reproduction program is selected.

By the clip information prescribed in the selected play list, the AV stream as content actual data or command is read out and reproduction of the AV stream or an execution process of the command is performed.

In the content reproduction process, discriminating of the units and the unit keys described above with reference to FIG. 1 are enabled according to the selected title, so that the unit key corresponding to the unit to be reproduced is acquired and the decoding process on a unit to unit basis is performed.

However, when executing the copying process described with reference to FIG. 2, the copying process information (dealManifest) shown in FIG. 3 received from the server is referenced to specify the data to be copied. Although the file name is recorded, however, information for discriminating the CPS units is not included in the copying process information (dealManifest) shown in FIG. 3. Therefore, the information processing apparatus 120 cannot discriminate the unit to be copied even when the copying process information (dealManifest) shown in FIG. 3 is referred.

[3. A Configuration of Copying Process Information (dealManifest) Proposed in the Invention]

Subsequently, a configuration of copying process information (dealManifest) proposed in the invention will be described.

FIG. 5 shows an example of a configuration of the copying process information (dealManifest) proposed in the invention.

The current copying process information (dealManifest) shown in FIG. 2 is set to includes at least any one of:

storage information of the copy authorization list 121 provided from the management server 140 to the information processing apparatus 120 shown in FIG. 2 and storage information of the copy control management file (MCMF) 111 stored in the first medium 110, and has a configuration which can be used in the information processing apparatus 120 configured to perform a copying process.

In other words, the content of the copying, process information is set as information which allows the information processing apparatus 120 to reference when copying the content in the first medium 110 to the second medium 150.

The copying process information (dealManifest) shown in FIG. 5 is XML descriptive data as data in FIG. 3 as described above, and is configured by two items of information shown below.

(a) First information 201 [MCUALL] for executing the copying process of files in the entire directory as objects to be copied.

(b) Second information 202 [MCUPARTIAL] for executing the copying process of individual files set in the entire directory as objects to be copied.

The copying process information (dealManifest) proposed in the invention includes all the items of information described with reference to FIG. 3, and further includes title information 203 shown in FIG. 5.

The title information 203 is identification information of a title set as index data corresponding to the units described above with reference to FIG. 1. The title information may either be ID information for identifying individual titles or titles themselves.

In other words, the title information 203 may be any information as long as it allows the information processing apparatus configured to execute a copying process to acquire a title corresponding to a unit to be copied therefrom.

The sequence of the copying process using the copying process information (dealManifest) shown in FIG. 5 will be as follows, for example.

The information processing apparatus 120 presents displayed information on the basis of the XML descriptive data shown in FIG. 5 on the display.

Since the copying process information (dealManifest) shown in FIG. 5 includes title information, information displayed on the display is display information including titles. Accordingly, the user is allowed to select a content to be copied with a specified title included in the display information.

As described above with reference to FIG. 1, the titles are indices of the CPS units, and are set in association with the CPS units and the CPS unit keys. Therefore, the information processing apparatus 120 is capable of specifying the CPS unit and the CPS unit key by the specified title.

The information processing apparatus configured to execute the copying process is capable of acquiring a unit key by acquiring title information specified by the user from the copying process information (dealManifest) shown in FIG. 5, specifying a unit key corresponding to the unit to be copied on the basis of the title acquired using the unit key management table shown in FIG. 1.

The CPS unit key by itself is stored in a CPS unit key file in the management data 112 shown in FIG. 2. In order to acquire a specific CPS unit key from the CPS unit key file, unit key identifiers (Ku1 to Kun) recorded in the unit key management table shown in FIG. 1 are used, and acquires a unit key corresponding to the title from the CPS unit key file on the basis of the unit key identifiers (Ku1 to Kun). The information processing apparatus 120 is capable of executing a recording process for the copy destination media by applying the acquired CPS unit key and performing a decoding process for the unit to be copied.

When performing the copying process for the copy destination, a process such as re-encryption corresponding to the management system compatible with the copy destination media is further performed after the decoding process as described above.

In this manner, by using the copying process information (dealManifest) including the title information 103 shown in FIG. 5, the title information corresponding to the unit to be copied can be obtained from the copying process information (dealManifest). Consequently, the information processing apparatus becomes capable of performing the copying process quickly by acquiring a unit key corresponding to the title and executing the decoding process on a unit to unit basis.

Referring now to a flowchart shown in FIG. 6, a copying process sequence using the copying process information (dealManifest) including the title information will be described.

Figure 6:
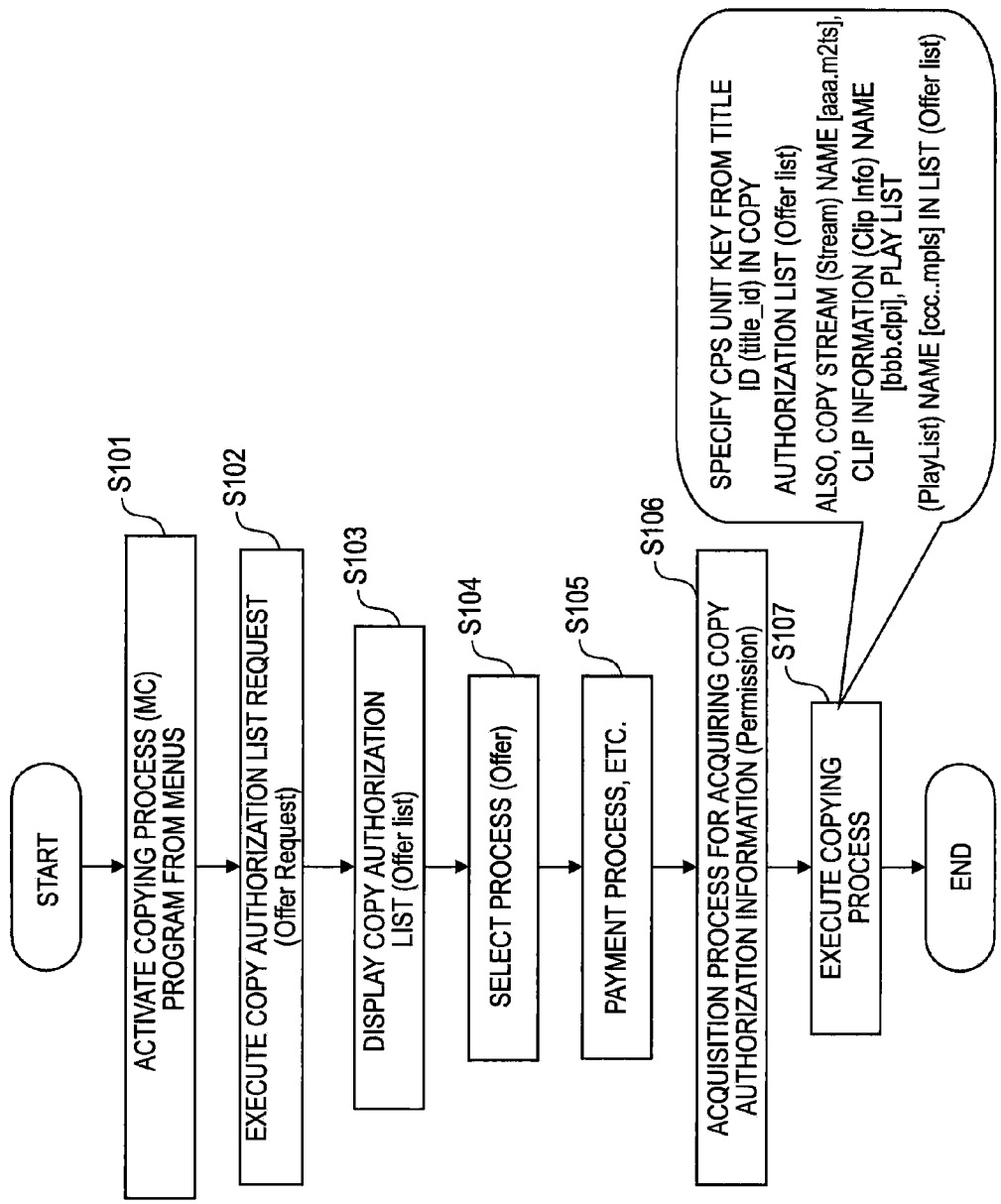
FIG. 6 is a flowchart for explaining a sequence of a copying process using the copying process information (dealManifest) according to the embodiment of the invention.

A flow shown in FIG. 6 is executed by the information processing apparatus 120 shown in FIG. 2. For example, in the control unit having a CPU of the information processing apparatus 120, a process is performed by executing a program (copying process (MC: Managed Copy) program) stored in the memory of the information processing apparatus 120 in advance.

Processes in the respective process steps in the flowchart shown in FIG. 6 will be described.

In Step S101, a copying process (MC) program is selected from menus displayed on the display unit of the information processing apparatus 120 and activated.

Subsequently, in Step S102, a request process (Offer Rerquest) for requesting the copy authorization list is executed. This process corresponds to the process in Step S11 described with reference to FIG. 2, and is performed as a sending process for sending the copy authorization list request (Offer Rerquest) with respect to the management server 140.

Subsequently, in Step S103, the copy authorization list (Offer list) received from the management server 140 is displayed on the display unit of the information processing apparatus 120. This list is display information generated on the basis of the copying process information (dealManifest) as the XML descriptive data described with reference to FIG. 5.

For reference, configuration in which the sending process for sending the copy authorization list request (Offer Rerquest) with respect to the management server 140 is automatically executed when the disc is loaded instead of at the time of execution of the copying process is also applicable. In other words, a configuration in which the information processing apparatus 120 sends a copy authorization list request (Offer Rerquest) to the management server 140 if the loading of the disc is detected, and receives the copy authorization list in advance from the management server 140 and stores the same in the memory of the information processing apparatus is also applicable.

In this case, since the copy authorization list is already stored in the memory of the information processing apparatus when the copying process is executed, communication with the management server 140 is omitted in the processes in Step S102 to S103, so that a process of reading out and displaying the copy authorization list from the memory of the information processing apparatus 120 is performed.

Subsequently, in Step S104, a process (Offer) is selected. More specifically, data to be copied is specified. This process is performed as an input process for the selected information via an input unit by the user, for example. The user is then capable of specifying a title included in the display information generated on the basis of the copying process information (dealManifest) described with reference to FIG. 5.

When the data to be copied is determined, the information is sent to the management server 140 and, in Step S105, a payment process according to a sequence prescribed in advance is executed. This process corresponds to the process applied with the payment data 131 shown in FIG. 2.

If the payment process in Step S105 is completed, the procedure goes to Step S106, where copy authorization information (Permission) is received from the management server 140, which is a receiving process for the copy authorization information 122 shown in FIG. 2.

Subsequently, the information processing apparatus 120 executes a copying process in Step S107. In this copying process, a decoding process on a unit to unit basis is executed as described below.

The information processing apparatus 120 selects a CPS unit key on the basis of title information (title_id) specified by the copying process information (dealManifest) shown in FIG. 5 included in the copy authorization list (Offer list).

The selected CPS unit key is a key applied to the encryption process and the decoding process corresponding to the CPS unit which is data to be copied, and the decoding process on a unit to unit basis is executed using the unit key.

The unit identification is executed according to the title, and a file acquisition from the first medium is executed by referencing respective file names, that is, stream (Stream) name [aaa.m2ts], clip information (Clip Info) name [bbb.clpi], and play list (PlayList) name (ccc..mpls], included in the copying process information (dealManifest) shown in FIG. 5 by, for example, a file belonging to a unit, and the copying process is performed.

For reference, the copying process in Step S107, as described above, is required to be executed in a sequence of:

(1) reading out of the encrypted content from the first medium 110 (copy source medium)

(2) decoding process of the encrypted content complying with the first management system compatible with the first medium 110 (copy source medium)

(3) encryption process of the content complying with the second management system compatible with the second medium 150 (copy destination medium)

(4) recording process with respect to the second medium 150 (copy destination medium) of the encrypted content.

With the configuration using the copying process information (dealManifest) including the title information 103 shown in FIG. 5, the information processing apparatus 120 is capable of acquiring the title information corresponding to the unit to be copied from the coping process information (dealManifest). Consequently, the information processing apparatus 120 becomes capable of performing the copying process quickly by acquiring a unit key corresponding to the title and executing the decoding process on a unit to unit basis.

[4. A Countermeasure for a Reproduction-Pass-Specific Content]

Subsequently, a countermeasure for realizing a smooth copying process when a content to be copied, that is, the encrypted content 113 recorded in the first medium 110 composed of, for example an ROM disc shown in FIG. 2 is a reproduction-pass-specific content will be described.

Figure 7:
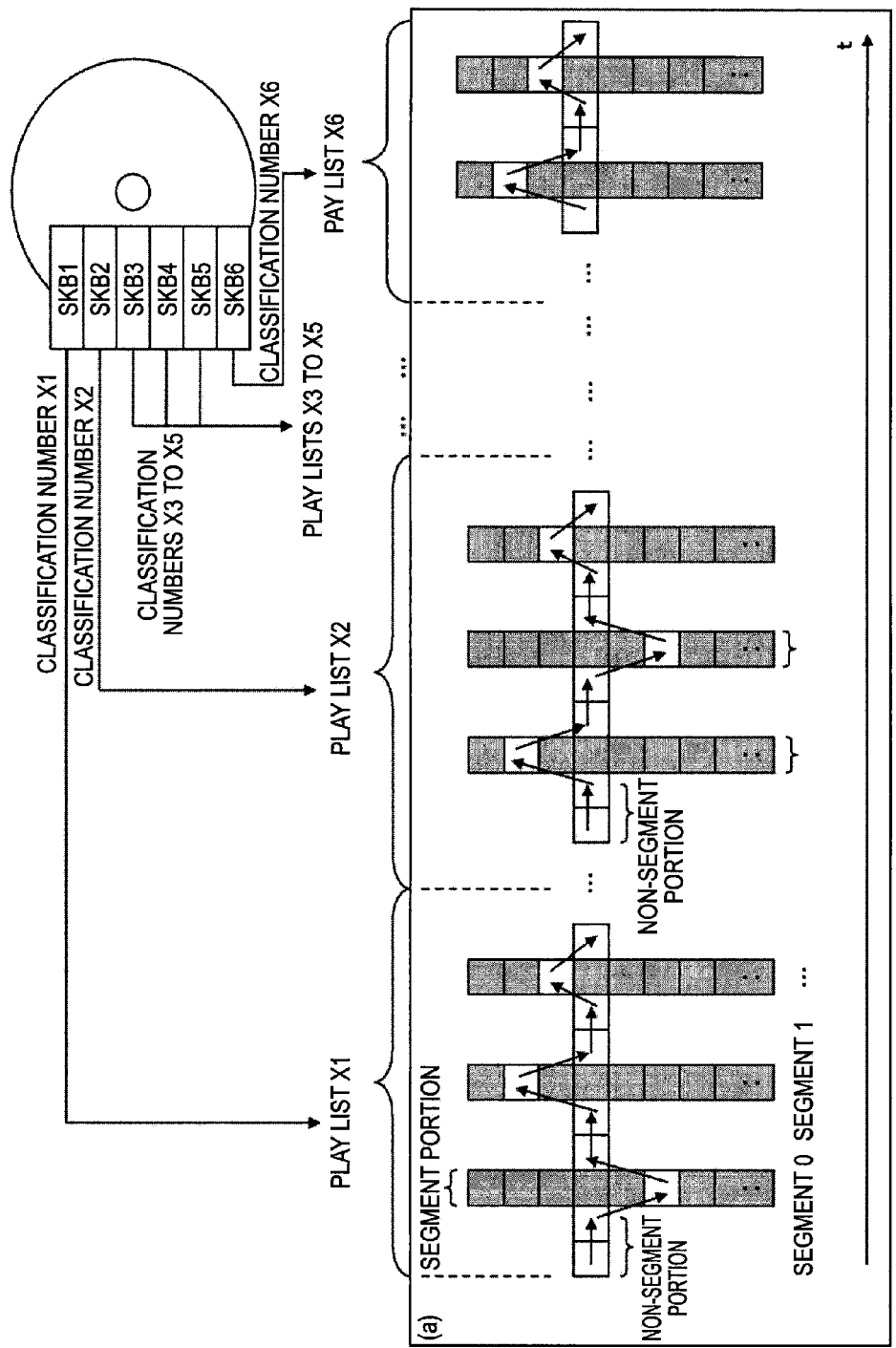
FIG. 7 is an explanatory drawing showing a reproduction process of a reproduction-pass-specific content applied with a sequence key and a segment key.

First of all, the reproduction-pass-specific content will be described with reference to FIG. 7. The contents are essentially encrypted on a unit to unit basis by the CPS unit keys as described above. The contents described below are contents each segmentalized into segment portions and non-segment portions, the non-segment portions being encrypted data on the basis of the CPS unit keys and the segment portions having a plurality of different variations, and the respective variations being encrypted by different segment keys as shown in FIG. 7(*a*). The variation data is data recognized as the same content by human sight or hearing, for example, but is data including different audio watermarks or video watermarks embedded therein or data having slightly different video data or audio data embedded therein among variation data in the same segment, so that which variation data in the corresponding segment is reproduced can be recognized when the copies of the content are flowed out.

When reproducing the content, content reproduction is performed according to a specific data pass (data sequence) set by selecting a specific segment data from a plurality of the segment portions. In the non-segment portions, the decoding process on the basis of the CPS unit keys is executed, and in the segment portions, a decoding process on the basis of the segment keys (Kseg) which can be acquired from a segment key file, thereby performing the content reproduction. The segment key file is a file in which data obtained by encrypting segment keys with respect to the variation data (encryption segment keys) in a plurality of segment portions are recorded by being sorted by classification numbers. The classification numbers are numbers corresponding to reproducing devices configured to select a play list which is acquired by processing the sequence key block using a sequence key as a key specific for the reproducing device. Furthermore, the encryption segment keys are recorded in the segment key file by the classification numbers as described above, and in each of the classification numbers, are recorded by being segmented from one play item to another. Therefore, if the classification number and the corresponding play item number are known, the segment key corresponding to the variation data is specified.

The information processing apparatus configured to execute the content reproduction process needs to acquire a CPS unit key corresponding to the non-segment portions and a segment key (Kseg) corresponding to the segment portions. A configuration of application of the segment key and the sequence key will be described with reference to FIG. 7.

FIG. 7(*a*) shows a configuration of a content stored in the medium (information recording medium). The content is reproduced along a time axis t shown from the left to the right. The content is roughly divided into n pieces of reproduction segments corresponding to n items of play lists X1 to Xn selected respectively by classification numbers X1 to Xn obtained respectively from a plurality of (n pieces of) sequence key blocks (SKB) stored in a medium (information recording medium).

In the example shown in FIG. 7, the number of reproduction segments n=6, and the content is roughly divided into n pieces of reproduction segments corresponding to the six items of play lists X1 to Xn selected respectively by the classification numbers X1 to Xn obtained respectively from the six pieces of sequence key blocks (SKB). For reference, although the identification information X1 to X6 of the classification numbers and the identification information X1 to X6 for the play lists are expressed by the same identifiers X1 to X6 here, it is an example for easy understanding, and the identification information X1 to X6 of the classification numbers and the identification information X1 to X6 of the play list only need to be associated, and other different identification information may be employed.

Each play list is setting information of a play item sequence row which determines a reproduction pass and, for example, the play list X1 shown in the drawing is a play list having information which specifies the reproduction pass following arrows shown in the content portion corresponding to the play list X1 shown in the drawing as the reproduction content. As regards the play lists X2 to X6, the reproduction passes for the respective corresponding content portions are prescribed. The information processing apparatus configured to execute the content reproduction obtains the classification numbers X1 to Xn from the plurality of (n pieces of) sequence key blocks (SKB) stored in the information recording medium, selects n items of of the play lists X1 to Xn selected respectively according to the obtained classification numbers, and applies the plurality of play lists X1 to Xn in sequence, so that the content reproduction is executed.

For example, first, information processing apparatus configured to execute the content reproduction applied with the play list X1 executes the reproduction by selecting the reproduction pass determined according to the play list X1, that is, content configuration data (play item) following the arrows in the drawing. The content is segmentalized into the segment portions and the non-segment portions as shown in the drawing, the non-segment portions is encrypted by the CPS unit key, and the segment portions have a plurality of variations which are each composed of segment data encrypted by different segment keys.

When reproducing the content, in the non-segment portions, the decoding process on the basis of the CPS unit keys is executed, and in the segment portions, a specific segment data prescribed by the play list is selected and a decoding process on the basis of the segment keys which can be acquired from the segment key file recorded in the information recording medium is executed, thereby performing the content reproduction.

As regards the play lists X2 to X6, the reproduction processes according to the reproduction passes prescribed by the respective play lists are executed in the same manner.

The segment key file having the segment keys stored therein is stored in the medium together with the content. For example, the segment key file is stored in the management data 112 in the first medium 110 shown in FIG. 2.

The sequence key block (SKB) required when obtaining the classification numbers X1 to Xn for selecting the play lists X1 to Xn which prescribes the reproduction pass is also stored in the management data 112.

A procedure of segment key acquiring process to be performed at the time of reproduction process for reproducing the reproduction content using the sequence key and the segment key as described above will be described with reference to FIG. 8.

Figure 8:
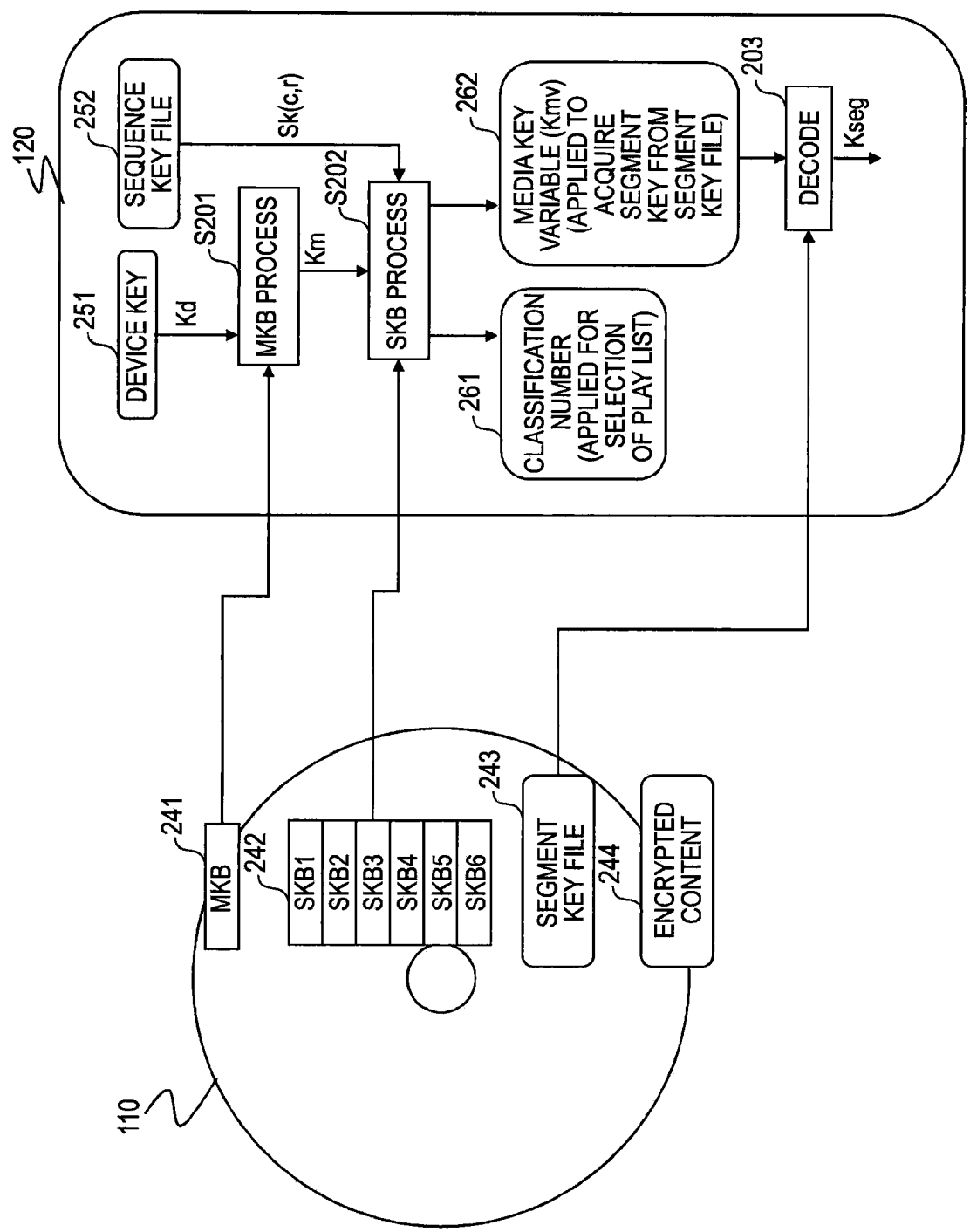
FIG. 8 is an explanatory drawing showing the reproduction process of the reproduction-pass-specific content applied with the sequence key and the segment key.

FIG. 8 shows the first medium 110 including an encrypted content 244 which can be reproduced using the sequence key and the segment key stored therein and the information processing apparatus 120 configured to perform the reproduction process.

The first medium 110 includes an MKB (Media Key Block) 241 as an encryption key block, a sequence key block (SKB) 242, and a segment key file 243 stored therein. For reference, these data are included in the management data 112 in the configuration shown in FIG. 2. Although the data such as the copy control management file 111 described above with reference to FIG. 2 is stored in the first medium 110, illustration is omitted in FIG. 8.

The MKB (Media Key Block) 241 as the encryption key block is the MKB (Media Key Block) as the encryption key block generated on the basis of a key distribution system of a tree structure known as a mode of a broadcast encryption system as described above, and is capable of taking out a media key (Kd) by the process applied with a device key 251 stored in the memory of the information processing apparatus 120. As described above, acquisition of a media key (Km) is enabled only when the information processing apparatus has an effective license. The invalidated information processing apparatus (subjected to the revoke process) is disabled to acquire the media key (Km).

Respective sequence key blocks (SKB1 to SKBn) included in the sequence key block (SKB) 242 include classification numbers (Variant No.) for selecting the play lists prescribed with the reproduction passes and information to be applied to the decoding and acquisition of the segment keys (media key variants (Kmv)) encrypted and stored in the segment key file stored therein, and the information processing apparatus configured to execute the content reproduction process acquires such information from the respective SKBs.

The processing sequence of the information processing apparatus 120 shown in FIG. 8 will be described. First of all, the information processing apparatus 120 executes the MKB process in Step S201 by applying the device key (Kd) 251 stored in the memory provided therein and acquires a media key (Km). As long as the information processing apparatus 120 is not a revoked apparatus (invalidated as an unfair apparatus), the information processing apparatus can perform the MKB process successfully, and acquire the media key (Km). If the information processing apparatus 120 is a revoked apparatus, the information processing apparatus fails to perform the MKB process, and cannot acquire the media key (Km). In such a case, the process from then onward cannot be executed, and the content reproduction is disabled.

If the information processing apparatus 120 is not a revoked apparatus and succeeds at the MKB process and hence acquires the media key (Km), subsequently in Step S202, executes the process of the SKB by applying the acquired media key (Km) and a sequence key acquired from the sequence key file stored in the information processing apparatus. The information processing apparatus 120 is capable of acquiring a classification number 261 and a media key variable (Kmv) 262 by the process of the SKB applied with the media key (Km) and the sequence key.

The classification number 261 is used as selection information of the play ist as described above. Furthermore, the classification number 261 can be used as information for acquiring the corresponding segment key from the segment key file. The media key variable (Kmv) 262 is used as information applied for acquiring a segment key from the segment key file having the segment keys stored therein to be applied for decoding the configuration data of the segment included in the reproduction pass prescribed by the selected play list.

In Step S103, the information processing apparatus 120 acquires the segment key file stored in the first medium 110, and acquires a segment key (Kseg) by the decoding process using the media key variable (Kmv) 262.

By using the segment key (Kseg), the data reproduction following the data pass selected by the play list corresponding to the classification number described above with reference to FIG. 7 is enabled. For reference, the CPS unit key is separately acquired from the CPS unit key file.

In this manner, the information processing apparatus 120 acquires a classification number by the process with respect to the sequence key block reproduced from the first medium 110 by using the sequence key stored in the memory, acquires the identification information of the play list using the classification number, and acquires a segment key corresponding to the specific variation in the corresponding segment from the segment key file including encrypted keys obtained by encrypting the keys for decoding data according to the reproduction pass.

The content reproduction process applied with the sequence key or the segment key is described in JP-A-2008-84445, which is a previous application of the applicant of the invention, in detail.

When copying the reproduction-pass-specific content which requires the reproduction applied with the sequence key or the segment key, the play list file according to the reproduction pass which can be used by the information processing apparatus cannot be discriminated only with data recorded in the copying process information (dealManifest) described above with reference to FIG. 3.

As described with reference to FIG. 7 and FIG. 8, when reproducing the reproduction-pass-specific content applied with the sequence key or the segment key, the play list corresponding to the classification number selected according to the sequence key that the information processing apparatus has must be acquired.

In other words, the play lists available by the respective information processing apparatuses are different, and hence performing processes of selecting an available play list associated with the corresponding information processing apparatus and decoding the content along the reproduction pass prescribed by the play list is required when performing the copying process. When performing the decoding process, the decoding process applied with the unit key and the segment key is required to be performed.

However, in the copying process information (dealManifest) shown in FIG. 3, only the file names set under the BDMV directory on down are listed. Which play lists are available play lists in the information processing apparatus by itself cannot be discriminated. Also, there is no information for acquiring a unit key or a segment key according to the reproduction pass.

The reproduction-pass-specific contents being reproducible by applying the sequence keys or the segment keys are contents reproduced along the specific reproduction passes, and the data along this reproduction pass is prescribed by play lists determined on the basis of the classification number associated with the information processing apparatus. In other words, clip information files and clip AV stream having information corresponding to the data passes are determined by the specific play lists corresponding to the specific reproduction passes allowed corresponding to the information processing apparatus.

When performing the copying process, if a play list available by the information processing apparatus is correctly selected, the clip information file or the clip AV stream as data to be copied corresponding to the reproduction pass can be acquired by applying the selected play list. Therefore, what is necessary when performing the copying process is a play list file name. Therefore, although the play list file name is necessary for the copying process information (dealManifest) to be referenced at the time of the copying process, a clip information file name or a clip AV stream name need not to be included.

In view of such circumstances, the copying process information (dealManifest) to be presented to the information processing apparatus (user's apparatus) when performing the copying process for the content applied with the sequence key or the segment key is configured to have a data configuration shown in FIG. 9.

The copying process information (dealManifest) shown in FIG. 9 is set to include at least any one of:

storage information of the copy authorization list 121 presented by the management server 140 to the information processing apparatus 120 shown in FIG. 2 and storage information of the copy control management file (MCMF) 111 stored in the first medium 110, and has a configuration which can be used in the information processing apparatus 120 configured to perform the copying process.

In other words, the content of the copying process information is set as information which allows the information processing apparatus 120 to reference when copying the content in the first medium 110 to the second medium 150.

The copying process information (dealManifest) shown in FIG. 9 is XML descriptive data as data in FIG. 3 and FIG. 5 described above, and is configured by two items of information shown below.

(a) First information 301 [MCUALL] for executing the copying process of files in the entire directory as objects to be copied.

(b) Second information 302 [MCUPARTIAL] for executing the copying process of individual files set in the directory as objects to be copied.

The coping process information (dealManifest) proposed in this example includes title information 303 like data shown in FIG. 5.

The title information 303 is identification information of a title set as index data corresponding to the units described above with reference to FIG. 1. The title information may either be information for identifying individual titles or titles themselves. In other words, the title information 303 may be any information as long as it allows the information processing apparatus configured to execute copying process to acquire title data corresponding to a unit to be copied therefrom.

Furthermore, the copying process information (dealManifest) in this example does not record the clip information file name or the clip AV stream name in the second information 302 [MCUPARTIAL].

The play list file name, that is, a play list file name <FileName>BDMV/PLAYLIST/00000.mpls</FileName> is recorded in the second information 302 [MCUPARTIAL] of the copying process information (dealManifest) shown in FIG. 9, while the file names such as the clip information (CLIPINF), clip AV stream (STREAM) and so on shown in FIG. 3 and FIG. 5 are not recorded.

This is because when performing the copying process, if a play list available by the information processing apparatus is correctly selected, the clip information file or the clip AV stream as data to be copied corresponding to the reproduction pass can be obtained by applying the selected play list. On the basis of such a reason, the play list file name is recorded in the second information 302 [MCUPARTIAL] of the copying process information (dealManifest) shown in FIG. 9, while the clip information file name, the clip AV stream name, or the like are not recorded.

Subsequently, referring to a flowchart shown in FIG. 10, a sequence of the copying process of the reproduction-pass-specific content will be described. For reference, when performing the copying process, the copying process information (dealManifest) shown in FIG. 9 is used.

Figure 10:
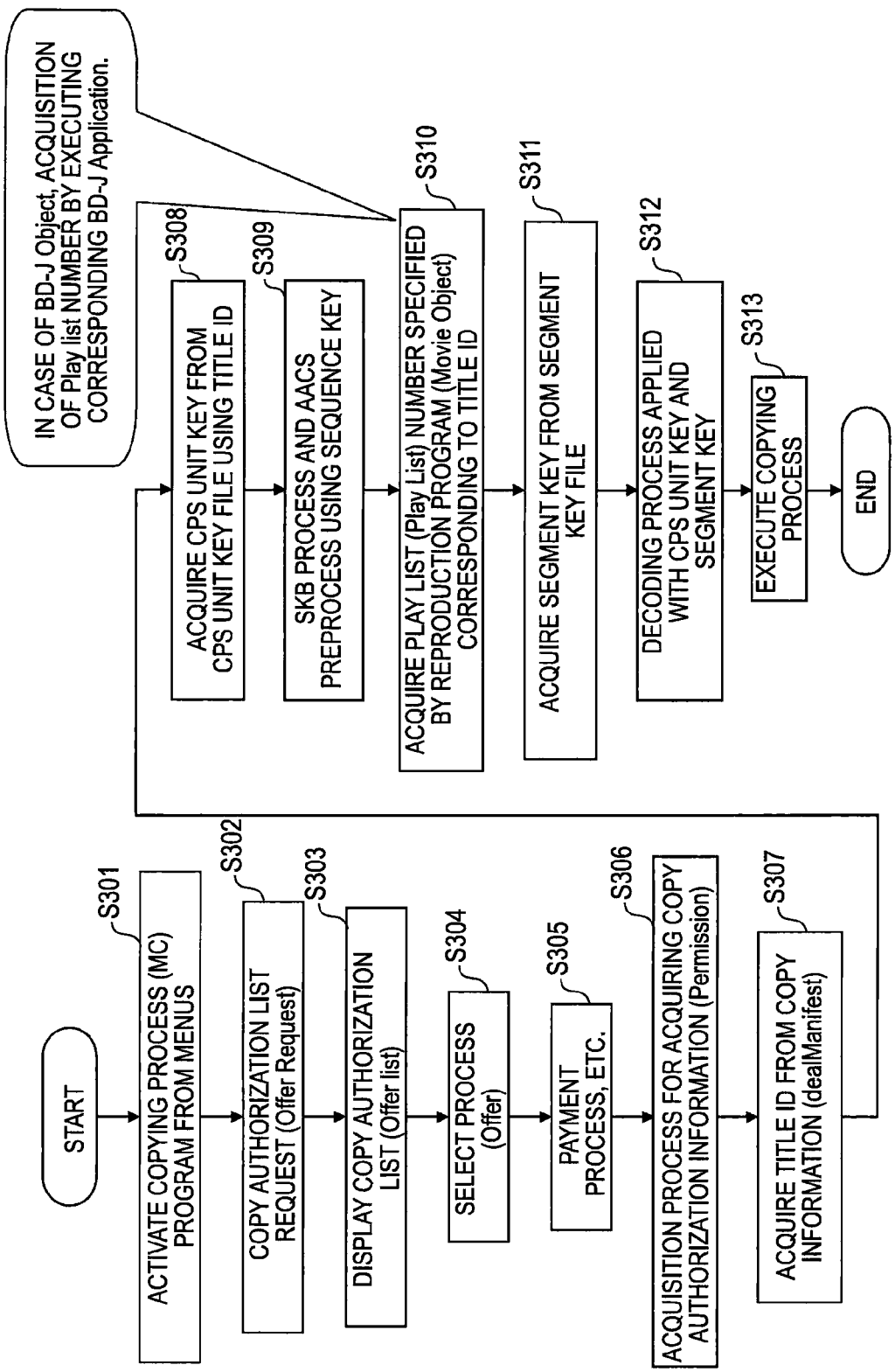
FIG. 10 is an explanatory drawing showing the sequence of the copying process using the copying process information (dealManifest) according to the embodiment of the invention.

A flow shown in FIG. 10 is executed by the information processing apparatus 120 shown in FIG. 2. For example, in the control unit having the CPU of the information processing apparatus 120, a process is performed by executing a program (copying process (MC: Managed Copy) program) stored in the memory of the information processing apparatus 120 in advance.

Processes in the respective process steps in a flowchart shown in FIG. 10 will be described.

In Step S301, a copying process (MC) program is selected from the menus displayed on the display unit of the information processing apparatus 120 and activated.

Subsequently, in Step S302, a copy authorization list request (Offer Rerquest) is executed. This process corresponds to the process in Step S11 described with reference to FIG. 2, and is performed as a sending process for sending the copy authorization list request (Offer Rerquest) with respect to the management server 140.

Subsequently, in Step S303, the copy authorization list (Offer list) received from the management server 140 is displayed on the display unit of the information processing apparatus 120. This list is display information generated on the basis of the copying process information (dealManifest) as the XML descriptive data described with reference to FIG. 9.

For reference, a configuration in which the sending process for sending the copy authorization list request (Offer Rerquest) with respect to the management server 140 is automatically executed when the disc is loaded instead of at the time of execution of the copying process is also applicable. In other words, the information processing apparatus 120 receives the copy authorization list in advance from the management server 140 and stores the same in the memory of the information processing apparatus when the disc is loaded.

In this case, since the copy authorization list is already stored in the memory of the information processing apparatus at the time of execution of the copying process, communication with the management server 140 is omitted in the processes in Steps S302 to S303, so that a process of reading out and displaying the copy authorization list from the memory of the information processing apparatus 120 is performed.

Subsequently, in Step S304, a process (Offer) is selected. More specifically, data to be copied is specified. This process is performed as an input process for the selected information via the input unit by the user. The user is then capable of specifying a title included in the display information generated on the basis of the copying process information (dealManifest) described with reference to FIG. 9, for example.

When the data to be copied is determined, the information is sent to the management server 140 and, in Step S305, a payment process according to a prescribed sequence is executed. This process corresponds to the process applied with the payment data 131 shown in FIG. 2.

When the payment process in Step S305 is completed, the procedure goes to Step S306, where the copy authorization information (Permission) is received from the management server 140, which is a receiving process for the copy authorization information 122 shown in FIG. 2.

Subsequently, in Step S307, the information processing apparatus 120 acquires the title information selected from the copying process information (dealManifest) by the user as an object to be copied.

Subsequently, in Step S308, the information processing apparatus 120 acquires a CPS unit key associated with the selected title information on the basis of the title information. As described above, the CPS unit key by itself is stored in the CPS unit key file in the management data 112 shown in FIG. 2. In order to acquire a specific CPS unit key from the CPS unit key file, the unit key identifiers (Ku1 to Kun) recorded in the unit key management table shown in FIG. 1 are used, whereby a unit key corresponding to the title from the CPS unit key file on the basis of the unit key identifiers (Ku1 to Kun) is acquired.

Subsequently, in Step S309, the information processing apparatus 120 applies the sequence key stored in the memory of the information processing apparatus to execute the SKB process or the AACS process (the MKP process in FIG. 8 or the like) described with reference to FIG. 8.

Subsequently, in Step S310, the information processing apparatus acquires a play list (Play list) number specified by the reproduction program (Movie Object) corresponding to the title information selected as the object to be copied. This corresponds to an acquisition process for acquiring the classification number by the SKB process described with reference to FIG. 8. For reference, if the content to be copied is a content configured to be activated by Java (registered trademark) application, a BD-J application, which is Java (registered trademark) application, is executed to acquire the play list number.

Subsequently, in Step S311, the information processing apparatus acquires a segment key from the segment key file. This process corresponds to the segment key acquisition process on the basis of the decoding process of the segment key file 243 applied with the media key variable acquired by the SKB process described with reference to FIG. 8.

Subsequently, in Step S312, the information processing apparatus performs the decoding process for the content to be copied using the CPS unit key and the segment key. The content to be decoded is a content corresponding to the title information acquired in Step S307, and is a content corresponding to the reproduction pass selected by the play list determined on the basis of the process described with reference to FIG. 8.

Subsequently, in Step S313, the information processing apparatus uses the decoded content to perform the recording process of the copy data with respect to the second medium 150 (see FIG. 2) such as an HDD, an R/RE disc, or the like as a copy destination medium.

The copying process, as described above, is required to be performed in a sequence of:

(1) reading out of the encrypted content from the first medium 110 (copy source medium)

(2) decoding process of the encrypted content complying with the first management system compatible with the first medium 110 (copy source medium)

(3) encryption process of the content complying with the second management system compatible with the second medium 150 (copy destination medium)

(4) recording process with respect to the second medium 150 (copy destination medium) of the encrypted content.

The process described with reference to the flowchart shown in FIG. 10 executes a process of copying the content stored in the first medium to the second medium without performing the reproduction process of the content to be copied.

Referring now to a flowchart shown in FIG. 11, a sequence of a case of executing a reproducing process of the content stored in the first medium and, after the reproducing process of the content has started, performing the copying process with respect to the second medium will be described. When the content is currently in reproduction, for example, a copy execution button is displayed as UI on the display of the information processing apparatus. It is a sequence that the user starts the copying process by an operation with respect to the button, for example, a remote control operation.

Figure 11:
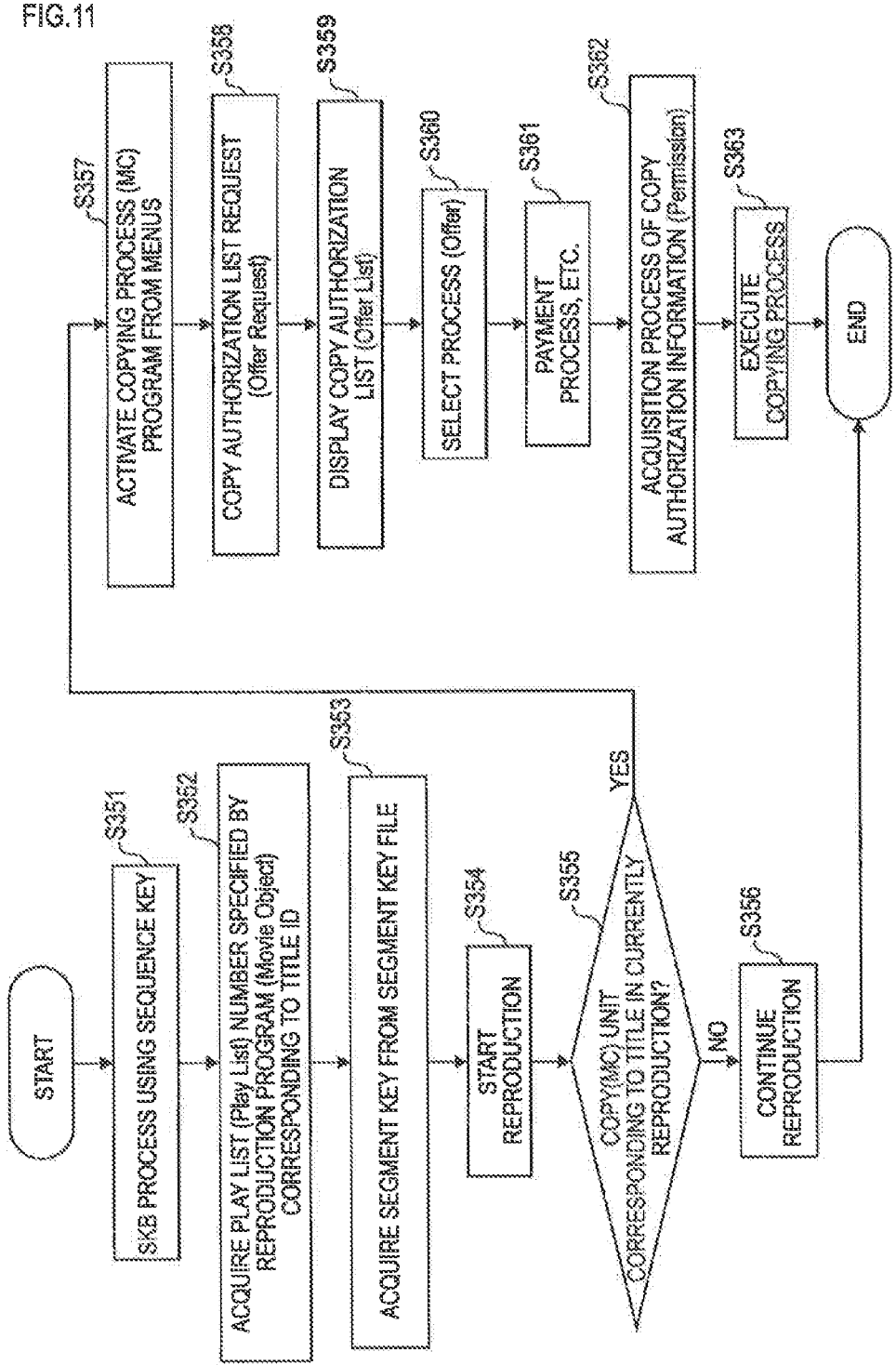
FIG. 11 is an explanatory drawing showing the sequence of the copying process using the copying process information (dealManifest) according to the embodiment of the invention.

A flow shown in FIG. 11 is executed by the information processing apparatus 120 shown in FIG. 2. For example, in the control unit having the CPU of the information processing apparatus 120, a process is performed by executing a program (copying process (MC: Managed Copy) program) stored in the memory of the information processing apparatus 120 in advance.

Processes in the respective process steps in the flowchart shown in FIG. 11 will be described.

The processes in Steps S351 to S354 are a content reproduction sequence applied with the sequence key or the segment key.

In Step S351, the information processing apparatus 120 applies the sequence key stored in the memory of the information processing apparatus to execute the SKB process described with reference to FIG. 8.

Subsequently, in Step S352, the information processing apparatus acquires a play list (Play list) number selected by the reproduction program (Movie Object) corresponding to the title information selected by the user as an object to be reproduced. This corresponds to an acquisition process for acquiring the classification number by the SKB process described with reference to FIG. 8.

Subsequently, in Step S353, the information processing apparatus acquires a segment key from the segment key file. This process corresponds to the segment key acquisition process on the basis of the decoding process of the segment key file 243 applied with the media key variable acquired by the SKB process described with reference to FIG. 8.

Subsequently, in Step S354, the information processing apparatus performs the decoding process for the content to be copied using the CPS unit key and the segment key. For reference, the CPS unit key is acquired from the unit key file on the basis of the unit key ID acquired from the unit key management table described with reference to FIG. 1 on the basis of the title information selected as the object to be reproduced. The content to be reproduced is a content corresponding to the title information, and is a content corresponding to the reproduction pass selected by the play list determined on the basis of the process described with reference to FIG. 8.

Subsequently, in Step S355, the presence or absence of an input of a copy request for a unit included in the content corresponding to the title being in reproduction by the user is determined. When the content is currently in reproduction, for example, the copy execution button is displayed as UI information on the display of the information processing apparatus. The control unit of the information processing apparatus determines the presence and absence of an operation of the copy execution button. For reference, an input of the copy execution button set on the information processing apparatus or on an accessory remote controller may be detected.

In Step S355, if the input of the copy request by the user is not detected, the reproducing process is continued in Step S356.

In contrast, in Step S355, if the input of the copy request by the user is detected, the procedure goes to Step S357.

In Step S357, a copying process (MC) program is selected from the menus displayed on the display unit of the information processing apparatus 120 and activated.

Subsequently, in Step S358, a copy authorization list request (Offer Rerquest) is executed. This process corresponds to the process in Step S11 described with reference to FIG. 2, and is performed as a sending process for sending the copy authorization list request (Offer Rerquest) with respect to the management server 140.

Subsequently, in Step S359, the copy authorization list (Offer list) received from the management server 140 is displayed on the display unit of the information processing apparatus 120. This list is display information generated on the basis of the copying process information (dealManifest) as the XML descriptive data described with reference to FIG. 9.

As described above, if a sending process for sending the copy authorization list request (Offer Rerquest) with respect to the management server 140 is automatically executed when the disc is loaded instead of the execution of the copying process as described above, since the copy authorization list is already stored in the memory of the information processing apparatus, communication with the management server 140 is omitted in the processes in Steps S358 to S359, so that a process of reading out and displaying the copy authorization list from the memory of the information processing apparatus 120 is performed.

Subsequently, in Step S360, a process (Offer) is selected. More specifically, data to be copied is specified. This process is performed as an input process for the selected information via the input unit by the user. The user is then capable of specifying a title included in the display information generated on the basis of the copying process information (dealManifest) described with reference to FIG. 9, for example.

When the data to be copied is determined, the information is sent to the management server 140 and, in Step S361, a payment process according to a sequence prescribed in advance is executed. This process corresponds to the process applied with the payment data 131 shown in FIG. 2.

When the payment process in Step S361 is completed, the procedure goes to Step S362, where the copy authorization information (Permission) is received from the management server 140, which is a receiving process for the copy authorization information 122 shown in FIG. 2.

Subsequently, in Step S363, the information processing apparatus performs the recording process of the copy data with respect to the second medium 150 (see FIG. 2) such as an HDD, or an R/RE disc as a copy destination medium. The decoding process is performed as a process using the segment key acquired in Step S353 and the CPS unit key acquired on the basis of the title information.

This example of the process is configured to execute copying of the reproducible content according to the reproduction pass set corresponding to the information processing apparatus described with reference to FIG. 7. When performing the copying process, a decoding process using the CPS unit key and the segment key is required.

In this example of the process, the information processing apparatus 120 which executes the copying process is configured to reference the copying process information (dealManifest) in which the title information as shown in FIG. 9 is recorded, and the play list file names are recorded. Furthermore, the information processing apparatus is configured to start the copying process after the classification number as the play list identification information corresponding to the play list file name has acquired and also the segment key has acquired by the process using the sequence key described with reference to FIG. 8.

With such a process, the copying process can be executed after the content according to the reproduction pass corresponding to the information processing apparatus has acquired without any error and decoded the same.

In the copying process of the content to be reproduced according to the reproduction pass set corresponding to the information processing apparatus in this manner, the process is executed in the following procedure.

A CPS unit key is acquired by applying the title specification information specified by applying the copying process information (dealManifest) shown in FIG. 9.

In addition, the SKB process shown in FIG. 8 is executed to acquire a classification number for specifying a play list (identification information which can specify a play list name) for executing the reproduction of the reproduction pass (see FIG. 7) set corresponding to the information processing apparatus.

A play list available for the information processing apparatus is acquired by using the play list name recorded in the copying process information (dealManifest) shown in FIG. 9 by using the classification number.

In addition, the copying process is performed by executing the decoding process for the content (AV stream file) specified by the selected play list by using the segment key and the CPS unit key obtained as a result of the SKB process shown in FIG. 8.

At the time of the copying process, the copying process is also executed on the play list and the clip information file specified by the play list.

With the processes as described above, a smooth copying process is realized.

[5. A Countermeasure for a Reproduction Content using a Content Code]

Subsequently, a countermeasure for realizing a smooth copying process when the content to be copied, that is, the encrypted content 113 recorded in the first medium 110 such as the ROM disc shown in FIG. 2 is a content reproducible by the process using the content code will be described.

First of all, a content reproduction process using the content code will be described with reference to FIG. 12. Shown in FIG. 12 are the first medium 110 having the reproduction content using the content code recorded therein and the information processing apparatus 120 configured to execute the reproduction process for reproducing the recorded content in the first medium 110.

Figure 12:
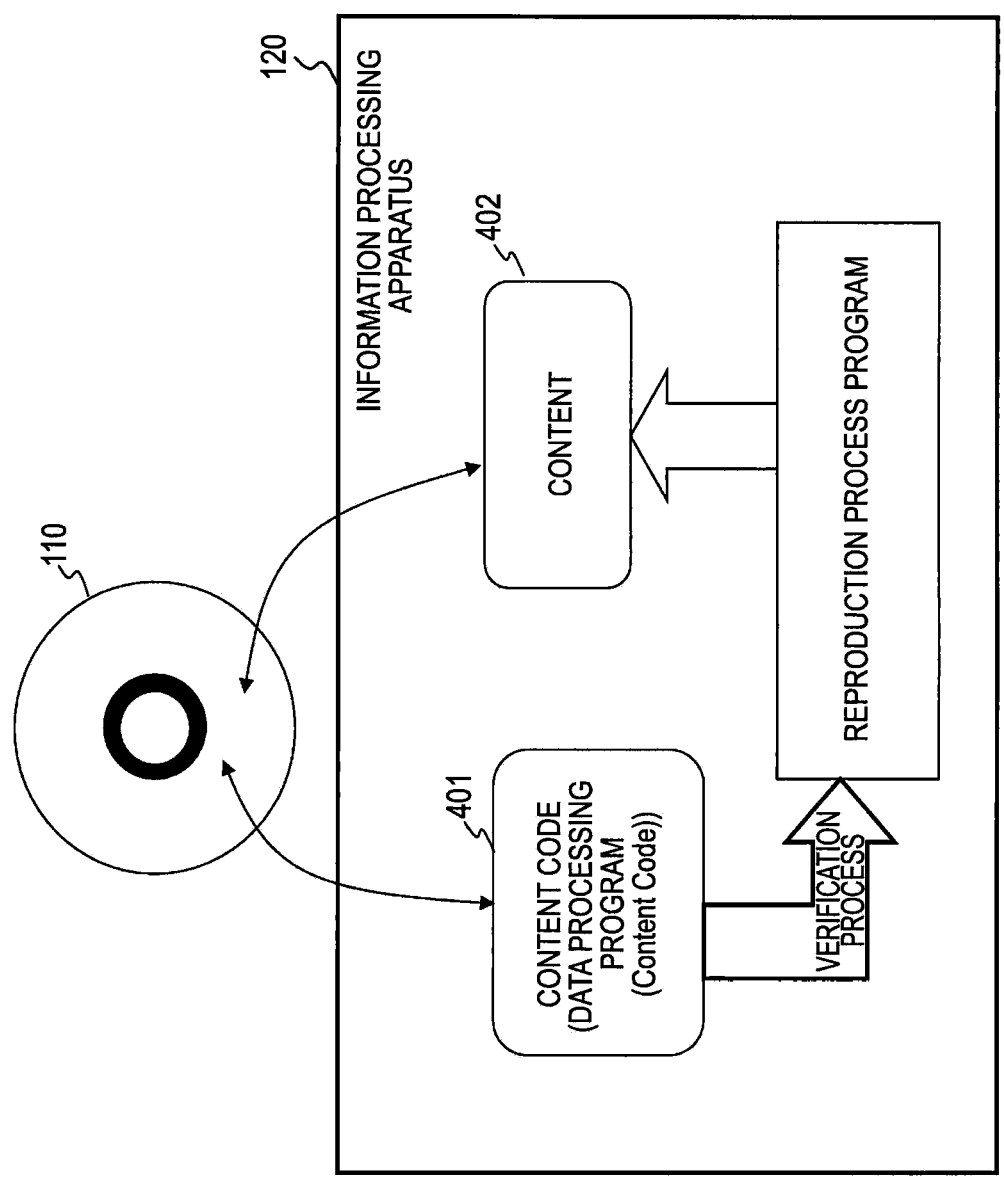
FIG. 12 is an explanatory drawing showing a reproduction process applied with a content code.

As shown in FIG. 12, a content code 401 is recorded in the first medium 110 together with a content 402. There are various types of content codes 401. For example, there are:

a content code configured to execute a reproducing sequence whether the reproducing process for the content 402 is performed in a correct sequence prescribed in advance or a verification process for the fairness of the content, or a content code configured to execute a conversion process for the configuration data of the content 402.

The content code is a program configured to execute such various processes, and is executed in the information processing apparatus configured to execute the reproduction process.

For example, the content code 401 shown in FIG. 12 is a content code configured to execute a verification process for verifying whether the reproduction process for the content 402 is correctly executed in a sequence prescribed in advance. In the information processing apparatus 120, when the content 402 read out from the first medium 110 is reproduced, the reproduction sequence of the information processing apparatus 120 is verified (checked) on the basis of the content code 401. More specifically, for example, such verification process that whether or not the reproduction process is executed correctly according to the prescribed sequence such as title #1, title #2, title #3, . . . , or whether the specification of the title is correctly performed after the menu display is performed.

If the fact that the process according to the prescribed process is not executed is detected, the reproduction process is forcedly stopped.

Figure 13:
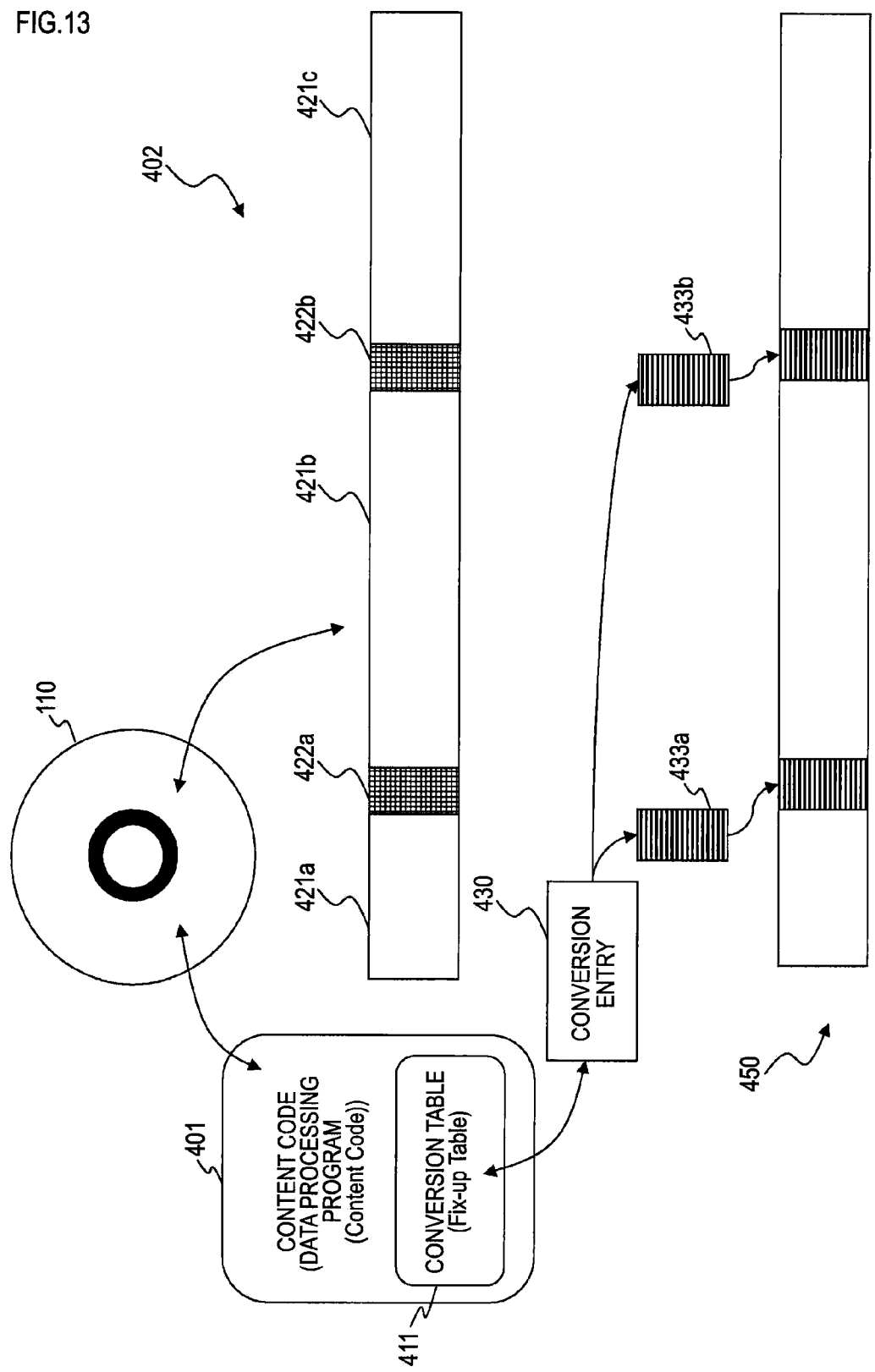
FIG. 13 is an explanatory drawing showing a content conversion process applied with a content code.

The content code shown in FIG. 13 is an example of the content code configured to execute the conversion process for the configuration data of the content 402.

The content 402 recorded in the first medium 110 includes, as shown in FIG. 13, normal content data 421*a, b, c*, . . . not to be deformed, and broken data 422*a, b*, . . . which are contents deformed and broken. The broken data 422 is data subjected to breakage by performing a data processing for the original content. Therefore, normal content reproduction cannot be executed by applying the content 402 including the broken data.

In order to perform the content reproduction, performing a process of replacing the broken data 422*a, b*, . . . included in the content 402 to be recorded with normal content data and generating a reproduction content 450 are required. Data for conversion (conversion data) as normal content data corresponding to the respective broken data areas is acquired from a conversion entry 430 registered in a conversion table (FUT (Fix-Up Table)) 411 in the content code 401. A process of replacing the data in the broken data areas with conversion data 433*a, b*, . . . acquired from the conversion entry 430 is executed to generate the reproduction content 450, and then reproduction is executed.

The configuration of the content code as shown above is described in Japanese Patent No. 4140624, which is a previous application of the applicant of the invention.

When executing the verification process for the reproduction sequence or the content applied with the content code as described above or the copying of the content to be reproduced on the conditions of the execution of the content configuration data conversion process, execution of the verification process or the data conversion process applied with the content code is required in the same manner as the reproduction process.

A sequence of the copying process for the content-code-applied content as decribed above will be described with reference to FIG. 14.

Figure 14:
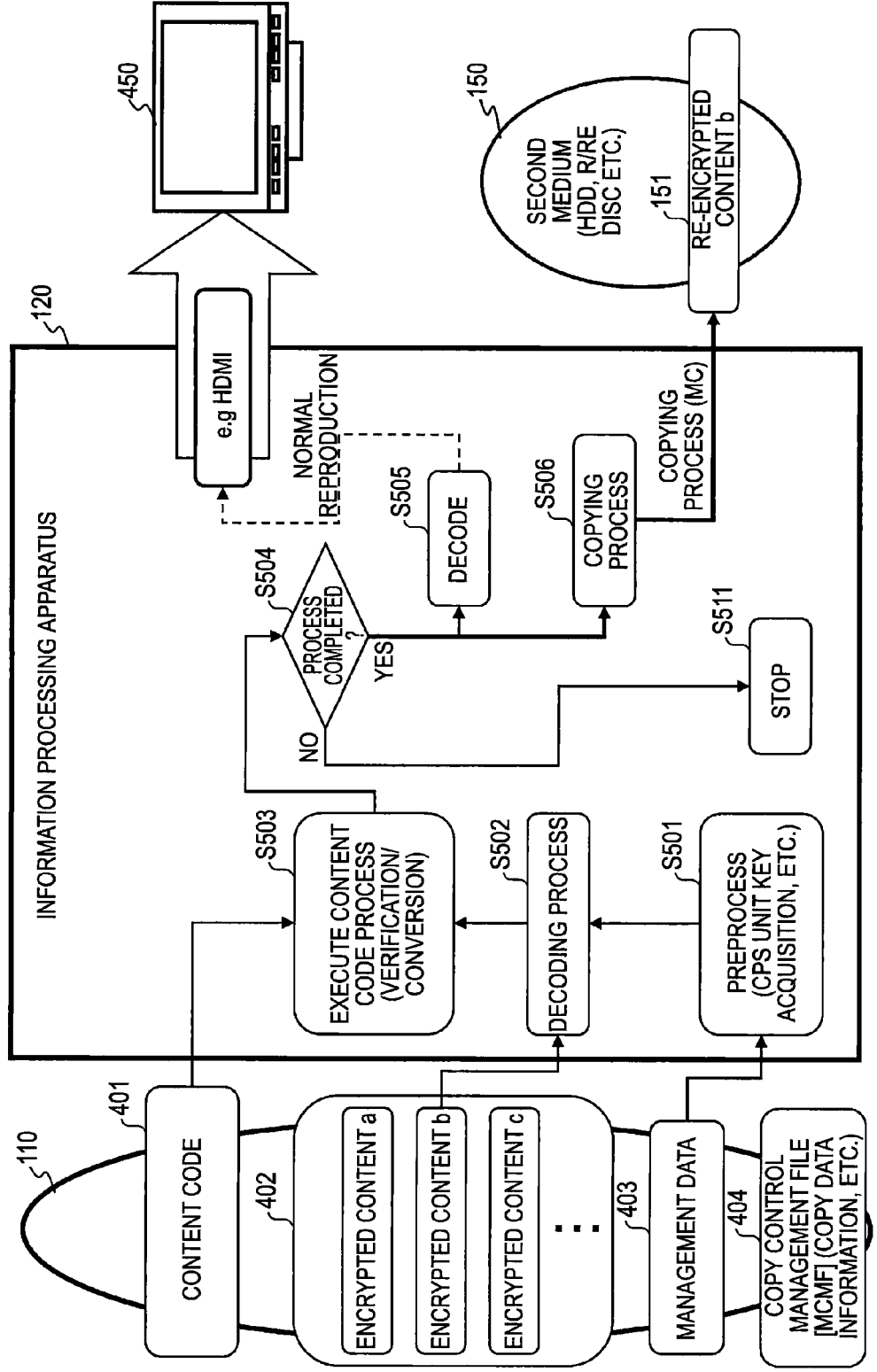
FIG. 14 is an explanatory drawing showing a reproduction process of a content to be reproduced by being applied with a content code and a sequence of a copying process.

Shown in FIG. 14 are the first medium 110 including the content 402 which requires the verification process or the conversion process applied with the content code to be performed at the time of reproduction stored therein and the information processing apparatus 120 configured to execute a process of reproducing or copying the content 402. The first medium 110 corresponds to the first medium 110 shown in FIG. 2.

The first medium 110 includes the content 402, the content code 401, a management data 403, and a copy control management file (MCMF) 404 stored therein. The first medium 110 is a medium including the contents of the copy source stored therein in the same manner as the first medium shown in FIG. 2. The management data 403 includes key information of the CPS unit key or the like stored therein. The copy control management file (MCMF) 404 includes a file (MCMF) including the copying process information (dealManifest) described with reference to FIG. 5 or the like stored therein.

A display device 450 shown on the right side in FIG. 14 is used as a display unit for the reproduction content. The second medium 150 is a copy destination media for a content to be recorded in the first medium 110, and is composed of, for example, an HDD or an R/RE disc, or the like.

When performing the copying process for the content, the information processing apparatus 120 firstly performs a content reproduction process. In Step S501, firstly, a preprocess is executed. More specifically, a CPS unit key to be used for decoding the reproduction content specified by the user is acquired from the management data 403.

The content reproduction process displays initial menus including title selection information on the display device 450, and is started by title selection by the user. Therefore, a required CPS unit key is acquired from the title on the basis of corresponding data in the unit key management table described above with reference to FIG. 1.

In Step S502, the decoding process is executed for the content 402 using the CPS unit key.

Then, in Step S503, the process of applying the content code 401 is performed. The content code applying process includes, for example, a verification process for verifying the reproduction sequence or the fairness of the content described with reference to FIG. 12, or the content conversion process described with reference to FIG. 13.

If the content code applying process as described above is completed (Yes in Step S504), the decoding process for the content reproduction process (Step S505) or the content copying process (Step S506) is executed.

If the content code applying process is not completed, for example, if the fact that a process according to the reproduction sequence prescribed in advance is not executed in the reproduction sequence verification process using the content code is detected, or if the conversion process using the conversion data is failed, the determination in Step S504 becomes No, and the procedure goes to Step S511, where the process is stopped.

For reference, the content copying process in Step S506, the process applied with the copy control management file (MCMF) is performed. More specifically, the process described above with reference to the flowchart in FIG. 6 is executed.

In other words, the copying process (MC) program is selected from menus displayed on the display unit of the information processing apparatus 120 or the display device 450 shown in FIG. 14 and activated, and a copy authorization list request (Offer Rerquest) is executed to send the copy authorization list request (Offer Rerquest) to the management server.

Subsequently, the copy authorization list (Offer list) received from the management server is displayed on the display unit. For example, it is display information generated on the basis of the copying process information (dealManifest) as the XML descriptive data described with reference to FIG. 5.

Subsequently, the data to be copied is executed by, for example, specifying the title, so that the payment process according to the sequence prescribed in advance is executed. This process corresponds to the process applied with the payment data 131 shown in FIG. 2. When the payment process is completed, the copy authorization information (Permission) is received from the management server, which is a receiving process for the copy authorization information 122 shown in FIG. 2. After the process described above is completed, the information processing apparatus 120 executes the copying process.

For reference, in this copying process, the decoding process on a unit to unit basis is executed. For reference, in this case, since the CPS unit key is selected already by specifying the title at the time of selecting the reproduction content, new selection of the CPS unit key is not necessary.

If the unit to be copied is only the unit of part of the reproduction content, at the time of copying process, the decoding process can be performed by selecting a CPS unit key applied to the copying process on the basis of the title selected from the copying process information (dealManifest) described with reference to FIG. 5.

As described above, if the content to be copied is the content to be subject to the verification or conversion process by the content code (the content-code-applied content), the following process is performed at the time of copying process.

Before starting the copying process, the content reproduction process according to the prescribed reproduction sequence is executed, and the verification process or the conversion process using the content code is executed.

Then, the procedure goes to the copying process.

At the time of the copying process, the copying process is performed by applying the copying process information (dealManifest) shown in FIG. 5 or FIG. 9 to apply the title specification information specified at the time of reproduction, thereby acquiring the CPS unit key, and decoding the content to be copied on a CPS unit to CPS unit basis by applying the acquired CPS unit key.

These processes realize a smooth copying process.

[6. An Embodiment in Which a Copying Process is Executed by Discriminating the Data Types of a Copy Source]

As described above, there are various contents as the types of the data to be copied recorded in the first medium. For example, the data type (content type) maybe segmentalized into the following three segments.

(a) Content encrypted by CPS unit key (unit encrypted content)

(b) Content reproduced by selecting a reproduction pass selected by a play list compatible with the information processing apparatus encrypted by the CPS unit key and the segment key (reproduction-pass-specific content)

(c) Content to be subject to the verification or the conversion processusing the content code (content-code-applied content).

All of the contents from (a) to (c) are contents encrypted on a unit to unit basis.

The information processing apparatus configured to execute the copying process is required to perform different processes depending on which one of the contents described above the content to be copied belongs to.

In the following description, an embodiment in which the content mode (content type) is discriminated and the copying process according to the result of determination is executed will be described with reference to flowcharts shown in FIG. 15 and FIG. 16.

Figure 15:
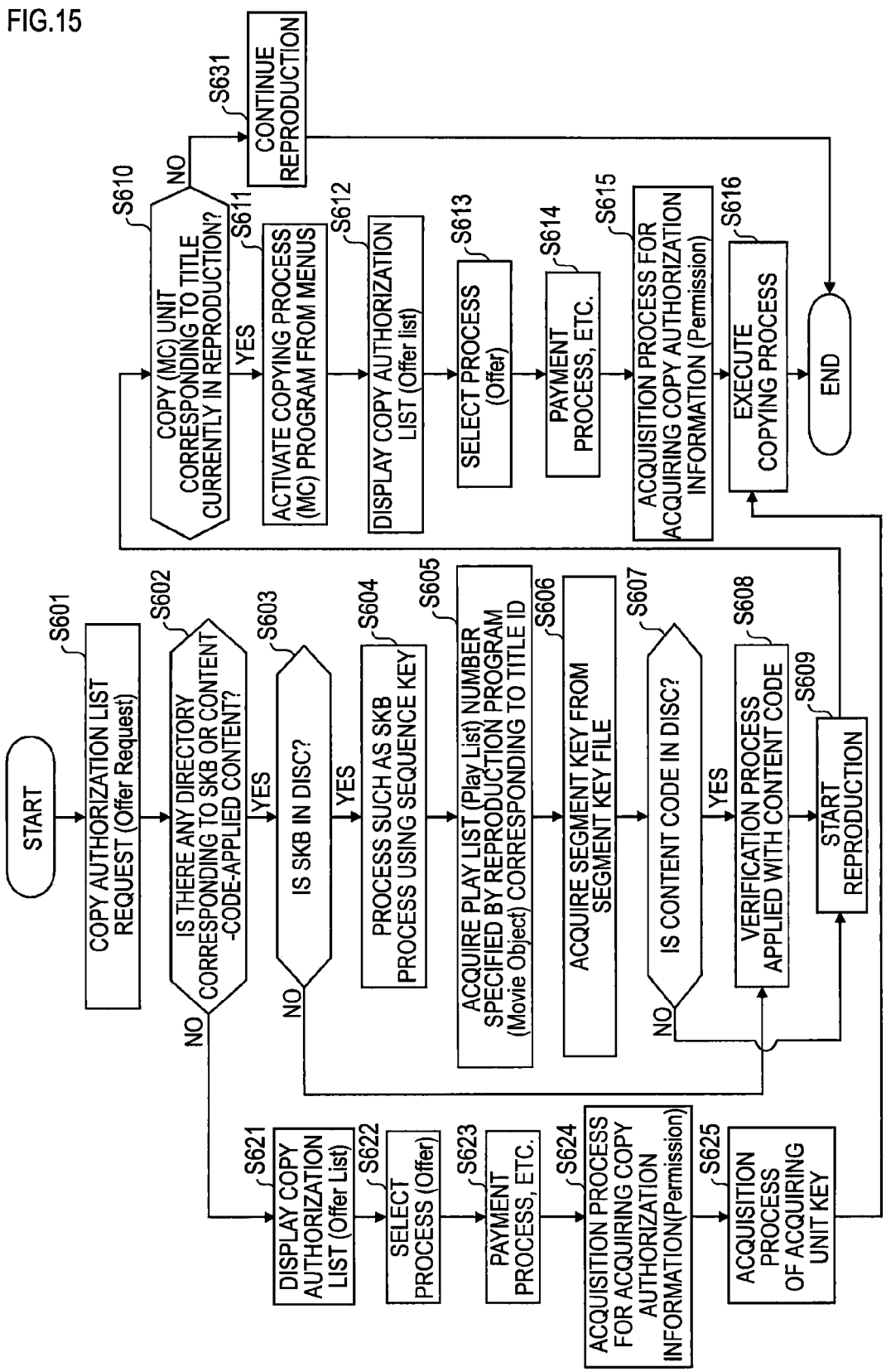
FIG. 15 is a flowchart for explaining a sequence of discriminating the type of the content, executing different processes according to the type, and performing a copying process of the content.

The flowchart shown in FIG. 15 is a sequence to be performed when the information processing apparatus 120 shown in FIG. 2 executes the copying process after sending the copy authorization list request (Offer Request) to the management server 140 at the time of loading of the first medium 110 including the content to be copied recorded therein, receiving the copy authorization list (Offerlist) from the management server 140 in advance and storing the same in the memory of the information processing apparatus, and then activating the copying process program (MC program).

Figure 16:
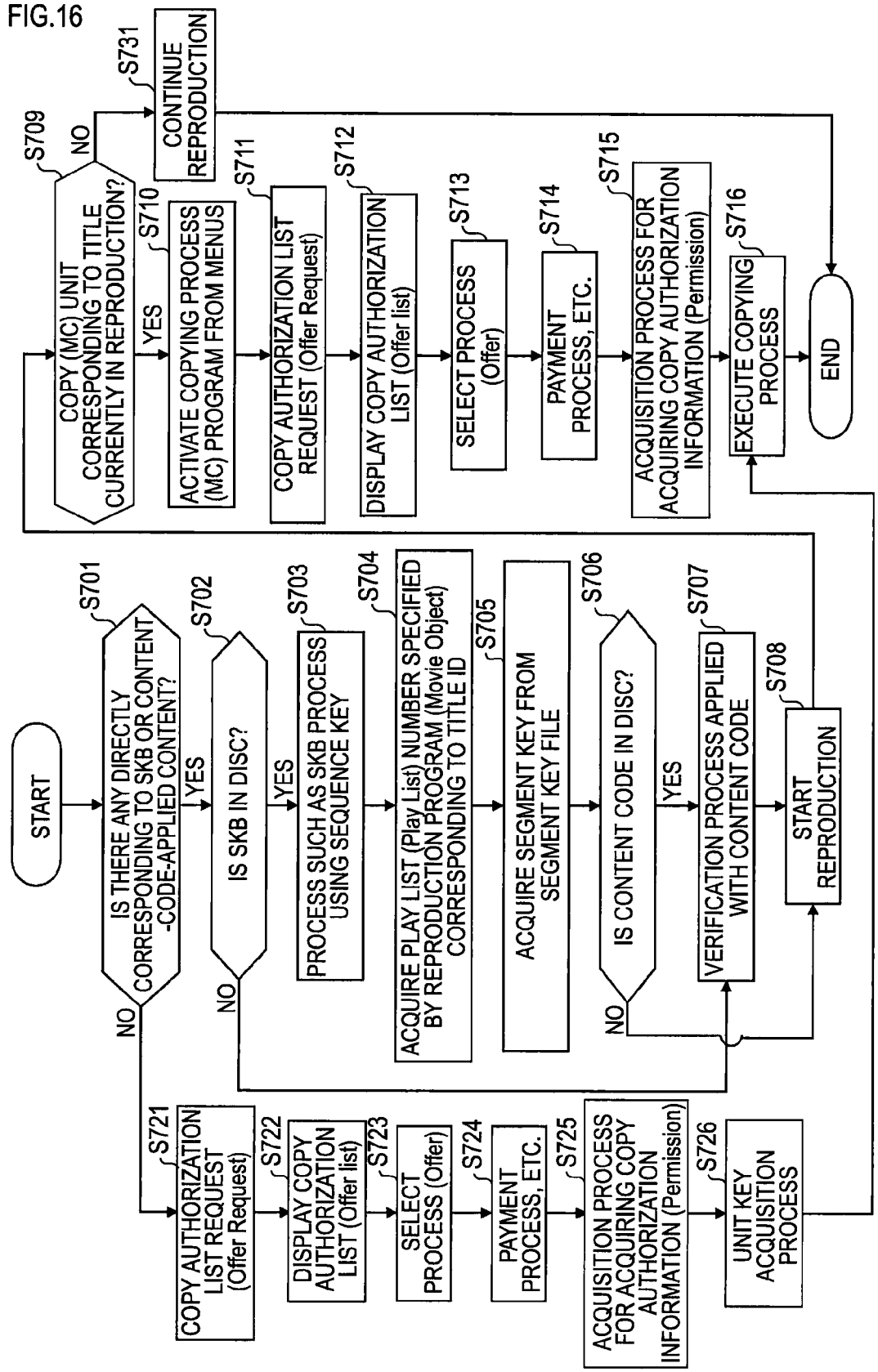
FIG. 16 is a flowchart for explaining the sequence of discriminating the type of the content, executing different processes according to the type, and performing the copying process of the content.

In contrast, the flowchart shown in FIG. 16 is a sequence to be performed when the information processing apparatus 120 shown in FIG. 2 performs the copying process after activating the copying process program (MC program) when executing the copy, then sending the copy authorization list request (Offer Request) with respect to the management server 140, and receiving the copy authorization list (Offerlist) from the management server 140 immediately before the execution of the copy.

Referring firstly to the flowchart shown in FIG. 15, a sequence to be performed when executing the process after receiving the copy authorization list (Offerlist) from the management server 140 in advance at the time of loading the disc and storing the same in the memory of the information processing apparatus will be described.

This process flow is a sequence to be performed when discriminating the type of the content to be copied, that is, the type of the content (content mode) recorded in the first medium 110 shown in FIG. 2 and executing the copying process according to the result of determination.

The flow shown in FIG. 15 is executed by the information processing apparatus 120 shown in FIG. 2. For example, in the control unit having the CPU of the information processing apparatus 120, a process is performed by executing a program (copying process (MC: Managed Copy) program) stored in the memory of the information processing apparatus 120 in advance.

Processes in the respective process steps in the flowchart shown in FIG. 15 will be described.

In Step S601, a copying process (MC) program is selected and activated from the menus displayed on the display unit of the information processing apparatus 120 and the copy authorization list request (Offer Rerquest) is executed. This process corresponds to the process in Step S11 described with reference to FIG. 2, and is performed as a sending process for sending the copy authorization list request (Offer Rerquest) with respect to the management server 140. In this manner, the flow shown in FIG. 15 is a flow which causes the sending process for sending the copy authorization list request (Offer Rerquest) with respect to the management server 140 to be automatically executed when the disc is loaded. With this process, the copy authorization list acquired from the management server 140 is stored in the memory of the information processing apparatus.

Subsequently, in Step S602, the information processing apparatus 120 verifies the directory of the first medium 110 (see FIG. 2) in which the content in the copy source is recorded, and executes a confirmation process for confirming whether or not there is a directory in which the content or data corresponding to the reproduction-pass-specific content or the content-code-applied content is set.

For reference, as described above, the content to be copied recorded in the first medium 110 is assumed to be of one of the types (a) to (c) shown below.

(a) Content encrypted by CPS unit key (Unit encrypted content)

(b) Content reproduced by selecting a reproduction pass selected by a play list compatible with the information processing apparatus encrypted by the CPS unit key and the segment key (reproduction-pass-specific content)

(c) Content to be subject to the verification or the conversion process using the content code (content-code-applied content)

In Step S602, if it is determined that there is no directory in which content or data corresponding to the reproduction-pass-specific content or the content-code-applied content is set in the directory of the first medium 110 in which the content in the copy source is recorded, the content in the first medium 110, that is, the content to be copied is determined to be (a) described above, that is, (a) Content encrypted by CPS unit key (Unit encrypted content).

In this case, after the respective processes in Steps S621 to S625 have executed, the copying process is performed in Step S616. In other words, the processes given below are executed in sequence.

Step S621

The copy authorization list (Offer list) received from the management server 140 is displayed on the display unit of the information processing apparatus 120. With the process in Step S601, the copy authorization list (Offer list) received already when the disc is loaded is taken out from the memory and displayed. This list is display information generated on the basis of the copying process information (dealManifest) as the XML descriptive data described with reference to FIG. 5.

Step S622

The process (Offer) is selected. More specifically, data to be copied is specified. This process is performed as an input process for the selected information via the input unit by the user. The user is then capable of specifying a title included in the display information generated on the basis of the copying process information (dealManifest) described with reference to FIG. 5, for example. When the data to be copied is determined, the information is sent to the management server 140.

Step S623

The payment process according to the sequence prescribed in advance is executed. This process corresponds to the process applied with the payment data 131 shown in FIG. 2.

Step S624

The copy authorization information (Permission) is received from the management server 140, which is a receiving process for the copy authorization information 122 shown in FIG. 2.

Step S625

The CPS unit key as a decoding key applied to the data to be copied (CPS unit) on the basis of the title information selected as the object to be copied is obtained. The CPS unit key is acquired from the unit key file on the basis of the unit key ID acquired from the unit key management table described with reference to FIG. 1 on the basis of the title information selected as the object to be reproduced.

Step S616

The CPS unit key acquired in Step S625 is applied to execute the decoding process for the content selected according to the title information, whereby the copying process is performed. In the recording process with respect to the second medium in the copying process, re-encryption process complying with the content management system compatible with the second medium is preferably performed, such as the re-encryption complying with the various content management systems compatible with the media including CPRM, Magic Gate, and VCPS.

Subsequently, a process to be performed if it is determined to be Yes in the determination process in Step S602 will be described. In other words, it is a process to be performed if it is determined that there is a directory in which the content or data corresponding to the reproduction-pass-specific content or the content-code-applied content is set among the directories in the first medium 110 in which the content in the copy source is recorded in Step S602. In this case, the content to be copied recorded in the first medium 110 is determined to be either one of the contents:

(b) Content reproduced by selecting a reproduction pass selected by a play list compatible with the information processing apparatus encrypted by the CPS unit key and the segment key (reproduction-pass-specific content), and (c) Content to be subject to the verification or the conversion process using the content code (content-code-applied content).

In this case, in the next Step S603, whether or not the sequence key block (SKB) is recorded in the first medium 110 in which the content to be copied is recorded is determined. The sequence key block (SKB) is, as described with reference to FIG. 8, a block in which the key information to be applied when reproducing the reproduction-pass-specific content is stored, and if there is this sequence key block (SKB), the content recorded in the first medium 110 is determined to be the reproduction-pass-specific content.

In Step S603, if it is determined that the sequence key block (SKB) is in the disc (first medium 110), the procedure goes to Step S604 and, if not, the procedure goes to Step S608. For reference, if it is determined to be not in the disc, the content recorded in the first medium 110 is determined to be the content-code-applied content.

In Step S603, if the SKB is recorded in the disc (first medium 110) and it is determined that the recorded content is the reproduction-pass-specific content, the procedure goes to Step S604, where the information processing apparatus 120 applies the sequence key stored in the memory of the information processing apparatus to execute the SKB process described with reference to FIG. 8.

Subsequently, in Step S605, the information processing apparatus acquires a play list (Play list) number specified by the reproduction program (Movie Object) corresponding to the title information selected by the user as the object to be reproduced. This corresponds to an acquisition process for acquiring the classification number by the SKB process described with reference to FIG. 8.

Subsequently, in Step S606, the information processing apparatus acquires a segment key from the segment key file. This process corresponds to the segment key acquisition process on the basis of the decoding process of the segment key file 243 applied with the media key variable acquired by the SKB process described with reference to FIG. 8.

Furthermore, in Step S607, the information processing apparatus verifies whether or not the content code is in the disc and, if not, the procedure goes to Step S609, and if yes, the procedure goes to Step S608.

If the content code is not in the disc, in Step S609, the information processing apparatus executes the decoding process and the reproducing process for the content to be copied using the CPS unit key and the segment key. For reference, the CPS unit key is acquired from the unit key file on the basis of the unit key ID acquired from the unit key management table described with reference to FIG. 1 on the basis of the title information selected as the object to be reproduced. The content to be reproduced is a content corresponding to the title information, and is a content corresponding to the reproduction pass selected by the play list determined on the basis of the process described with reference to FIG. 8.

In contrast, in Step S603, if it is determined that the sequence key block (SKB) is not in the disc (first medium 110), the content recorded in the first medium 110 is determined to be the content-code-applied content and the procedure goes to Step S608. Also, if the content code is determined to be in the disc in Step S607, the procedure goes to Step S608.

In Step S608, the process applied with the content code is performed. The content code applying process includes, for example, a verification (checking) process for verifying the reproduction sequence described with reference to FIG. 12, or the content conversion process described with reference to FIG. 13.

When the content code applying process is completed, the procedure goes to Step S609, where the decoding process for the content reproduction process is executed and the content reproduction process is started. When the content code applying process is not completed, for example, when the fact that a process according to the reproduction sequence prescribed in advance is not executed in the reproduction sequence verification process using the content code is detected or when the conversion process using the conversion data is failed, the reproduction process is stopped.

After the content reproduction process has started in Step S609, in Step S610, the presence or absence of an input of a copy request for a unit included in the content corresponding to the title being in reproduction by the user is determined. When the content is reproduced, for example, the copy execution button is displayed as UI information on the display of the information processing apparatus. The control unit of the information processing apparatus determines the presence or absence of an operation of the copy execution button. For reference, an input of the copy execution button set on the information processing apparatus or an accessory remote controller may be detected.

In Step S610, if the input of the copy request by the user is not detected, the reproducing process is continued in Step S631.

In contrast, in Step S610, if the input of the copy request by the user is detected, the procedure goes to Step S611.

In Step S611, a copying process (MC) program is selected from the menus displayed on the display unit of the information processing apparatus 120 and activated.

Subsequently, in Step S612, the copy authorization list (Offer list) received from the management server 140 in advance when the first medium 110 is loaded is acquired from the memory of the information processing apparatus 120 and is displayed on the display unit. This list is display information generated on the basis of the copying process information (dealManifest) as the XML descriptive data described with reference to FIG. 5 or FIG. 9.

For reference, if the data to be copied is a reproduction-pass-specific content, the copying process information (dealManifest) shown in FIG. 9 can be used. For reference, the copying process information (dealManifest) shown in FIG. 5 includes all the recorded data in the copying process information (dealManifest) shown in FIG. 9, and the copying process information (dealManifest) shown in FIG. 5 can be used if the data to be copied is the reproduction-pass-specific content and also if it is the content-code-applied content, and hence the copying process information (dealManifest) shown in FIG. 5 may be commonly used.

Subsequently, in Step S613, a process (Offer) is selected. More specifically, data to be copied is specified. This process is performed as an input process for the selected information via the input unit by the user. The user is then capable of specifying a title included in the display information generated on the basis of the copying process information (dealManifest) described with reference to FIG. 5 or FIG. 9, for example.

When the data to be copied is determined, the information is sent to the management server 140 and, in Step S614, a payment process according to a sequence prescribed in advance is executed. This process corresponds to the process applied with the payment data 131 shown in FIG. 2.

When the payment process in Step S614 is completed, the procedure goes to Step S615, where the copy authorization information (Permission) is received from the management server 140, which is a receiving process for the copy authorization information 122 shown in FIG. 2.

Subsequently, in Step S616, the information processing apparatus performs the recording process of the copy data with respect to the second medium 150 (see FIG. 2) such as an HDD, an R/RE disc as a copy destination medium.

For reference, at the time of copying process, if the content to be copied is a reproduction-pass-specific content, the decoding process for the content is performed as a process using the segment key acquired in Step S606 in advance and the CPS unit key acquired on the basis of the title information.

In this case, the content decoding process to be reproduced according to the reproduction pass set corresponding to the information processing apparatus described with reference to FIG. 7 is performed.

In contrast, if the content to be copied is the content-code-applied content, the decoding process for the content is performed as a process using the CPS unit key acquired on the basis of the title information.

Subsequently, referring to the flowchart shown in FIG. 16, a sequence to be performed when the information processing apparatus 120 shown in FIG. 2 executes the copying process after activating the copying process program (MC program) when executing the copy, then sending the copy authorization list request (Offer Request) with respect to the management server 140, and receiving the copy authorization list (Offer-list) from the management server 140 immediately before the execution of the copy will be described.

This process flow is also a sequence performed when discriminating the type of the content to be copied, that is, the type of the content (content mode) recorded in the first medium 110 shown in FIG. 2 and executing the copying process according to the result of determination.

The flow shown in FIG. 16 is executed by the information processing apparatus 120 shown in FIG. 2. For example, in the control unit having the CPU of the information processing apparatus 120, a process is performed by executing a program (copying process (MC: Managed Copy) program) stored in the memory of the information processing apparatus 120 in advance.

Processes in the respective process steps in the flowchart shown in FIG. 16 will be described.

In Step S701, the information processing apparatus 120 verifies the directory of the first medium 110 (see FIG. 2) in which the content in the copy source is recorded, and executes a confirmation process for confirming whether or not there is a directory in which the content or data corresponding to the reproduction-pass-specific content or the content-code-applied content is set.

The content to be copied recorded in the first medium 110 is assumed to be one of the types (a) to (c) shown below.

(a) Content encrypted by a CPS unit key (unit encrypted content)

(b) Content reproduced by selecting a reproduction pass selected by a play list compatible with the information processing apparatus encrypted by the CPS unit key and the segment key (reproduction-pass-specific content)

(c) Content to be subject to the verification or the conversion process using the content code (content-code-applied content)

In Step S702, if it is determined that there is no directory in which content or data corresponding to the reproduction-pass-specific content or the content-code-applied content in the directory of the first medium 110 in which the content in the copy source is recorded is set, the content to be copied in the first medium 110 is determined to be (a) Content encrypted by the CPS unit key (unit encrypted content).

In this case, after the respective processes in Steps S721 to S726 have executed, the copying process is performed in Step S716. In other words, the processes given below are executed in sequence.

Step S721

The copying process (MC) program is selected from the menus displayed on the display unit of the information processing apparatus 120 and activated, and the copy authorization list request (Offer Rerquest) is executed. This process corresponds to the process in Step S11 described with reference to FIG. 2, and is performed as a sending process for sending the copy authorization list request (Offer Rerquest) with respect to the management server 140.

Step S722

The copy authorization list (Offer list) received from the management server 140 is displayed on the display unit of the information processing apparatus 120. This list is display information generated on the basis of the copying process information (dealManifest) as the XML descriptive data described with reference to FIG. 5.

Step S723

The process (Offer) is selected. More specifically, data to be copied is specified. This process is performed as an input process for the selected information via the input unit by the user. The user is then capable of specifying a title included in the display information generated on the basis of the copying process information (dealManifest) described with reference to FIG. 5, for example. When the data to be copied is determined, the information is sent to the management server 140.

Step S724

A payment process according to the prescribed sequence is executed. This process corresponds to the process applied with the payment data 131 shown in FIG. 2.

Step S725

The copy authorization information (Permission) is received from the management server 140, which is a receiving process for the copy authorization information 122 shown in FIG. 2.

Step S726

The CPS unit key as a decoding key applied to the data to be copied (CPS unit) on the basis of the title information selected as the object to be copied is obtained. The CPS unit key is acquired from the unit key file on the basis of the unit key ID acquired from the unit key management table described with reference to FIG. 1 on the basis of the title information selected as the object to be reproduced.

Step S716

The CPS unit key acquired in Step S726 is applied to execute the decoding process for the content selected according to the title information, whereby the copying process is performed. For reference, in the recording process with respect to the second medium in the copying process, the re-encryption complying with the content management system compatible with the second medium is preferably performed, such as the re-encryption process complying with the various content management systems compatible with the media including CPRM, Magic Gate, and VCPS.

Subsequently, a process to be performed if it is determined to be Yes in the determination process in Step S701 will be described. In other words, it is a process to be performed if it is determined that there is a directory in which the content and data corresponding to the reproduction-pass-specific content or the content-code-applied content are set among the directories in the first medium 110 in which the content in the copy source is recorded in Step S701. In this case, the content to be copied recorded in the first medium 110 is determined to be either one of the contents:

(b) Content reproduced by selecting a reproduction pass selected by a play list compatible with the information processing apparatus encrypted by the CPS unit key and the segment key (reproduction-pass-specific content), and (c) Content to be subject to the verification or the conversion process using the content code (content-code-applied content).

In this case, in the next step S702, whether or not the sequence key block (SKB) is recorded in the first medium 110 in which the content to be copied is recorded is determined. The sequence key block (SKB) is, as described with reference to FIG. 8, a block in which the key information to be applied when reproducing the reproduction-pass-specific content is stored, and if there is this sequence key block (SKB), the content recorded in the first medium 110 is determined to be the reproduction-pass-specific content.

In Step S702, if it is determined that the sequence key block (SKB) is in the disc (first medium 110), the procedure goes to Step S703 and, if not, the procedure goes to Step S707. For reference, if it is determined to be not in the disc, the content recorded in the first medium 110 is determined to be the content-code-applied content.

In Step S702, if the SKB is recorded in the disc (first medium 110) and it is determined that the recorded content is the reproduction-pass-specific content, the procedure goes to Step S703, where the information processing apparatus 120 applies a sequence key stored in the memory of the information processing apparatus to execute the SKB process described with reference to FIG. 8.

Subsequently, in Step S704, the information processing apparatus acquires a play list (Play list) number specified by the corresponding reproduction program (Movie Object) corresponding to the title information selected by the user as the object to be reproduced. This corresponds to the acquisition process for acquiring the classification number by the SKB process described with reference to FIG. 8.

Subsequently, in Step S705, the information processing apparatus acquires the segment key from the segment key file. This process corresponds to the segment key acquisition process on the basis of the decoding process of the segment key file 243 applied with the media key variable acquired by the SKB process described with reference to FIG. 8.

Furthermore, in Step S706, the information processing apparatus verifies whether or not the content code is in the disc and, if not, the procedure goes to Step S708, and if yes, the procedure goes to Step S707.

If the content code is not in the disc, in Step S708, the information processing apparatus executes the decoding process and the reproducing process for the content to be copied using the CPS unit key and the segment key. For reference, the CPS unit key is acquired from the unit key file on the basis of the unit key ID acquired from the unit key management table described with reference to FIG. 1 on the basis of the title information selected as the object to be reproduced. The content to be reproduced is a content corresponding to the title information, and is a content corresponding to the reproduction pass selected by the play list determined on the basis of the process described with reference to FIG. 8.

In contrast, in Step S702, if it is determined that the sequence key block (SKB) is not in the disc (first medium 110), the content recorded in the first medium 110 is determined to be the content-code-applied content and the procedure goes to Step S707. Also, if the content code is determined to be in the disc in Step S706, the procedure goes to Step S707.

In Step S707, the process applied with the content code is performed. The content code applying process includes, for example, a verification(checking) process for verifying the reproduction sequence described with reference to FIG. 12, or the content conversion process described with reference to FIG. 13.

When the content code applying process is completed, the procedure goes to Step S708, where the decoding process for the content reproduction process is executed and the content reproduction process is started. When the content code applying process is not completed, for example, when the fact that a process according to the reproduction sequence prescribed in advance is not executed in the reproduction sequence verification process using the content code is detected or when the conversion process using the conversion data is failed, the reproduction process is stopped.

After the content reproduction process has started in Step S708, in Step S709, the presence or absence of an input of a copy request for a unit included in the content corresponding to the title being in reproduction by the user is determined. When the content is currently in reproduction, for example, the copy execution button is displayed as UI information on the display of the information processing apparatus. The control unit of the information processing apparatus determines the presence or absence of an operation of the copy execution button. For reference, an input of the copy execution button set on the information processing apparatus or the accessory remote controller may be detected.

In Step S709, if the input of the copy request by the user is not detected, the reproducing process is continued in Step S731.

In contrast, in Step S709, if the input of the copy request by the user is detected, the procedure goes to Step S710.

In Step S710, a copying process (MC) program is selected from the menus displayed on the display unit of the information processing apparatus 120 and activated.

Subsequently, in Step S711, the copying process (MC) program is selected from the menus displayed on the display unit of the information processing apparatus 120 and activated, and the copy authorization list request (offer Rerquest) is executed. This process corresponds to the process in Step S11 described with reference to FIG. 2, and is performed as a sending process for sending the copy authorization list request (Offer Rerquest) with respect to the management server 140.

Subsequently, in Step S712, the copy authorization list (Offer list) received from the management server 140 in advance when the first medium 110 is loaded is acquired from the memory of the information processing apparatus 120 and is displayed on the display unit. This list is display information generated on the basis of the copying process information (dealManifest) as the XML descriptive data described with reference to FIG. 5 or FIG. 9.

If the data to be copied is a reproduction-pass-specific content, the copying process information (dealManifest) shown in FIG. 9 can be used. For reference, the copying process information (dealManifest) shown in FIG. 5 includes all the recorded data in the copying process information (dealManifest) shown in FIG. 9, and the copying process information (dealManifest) shown in FIG. 5 can be used if the data to be copied is the reproduction-pass-specific content and also if it is the content-code-applied content, and hence the copying process information (dealManifest) shown in FIG. 5 may be commonly used.

Subsequently, in Step S713, a process (Offer) is selected. More specifically, data to be copied is specified. This process is performed as an input process for the selected information via the input unit by the user. The user is then capable of specifying a title included in the display information generated on the basis of the copying process information (deal-Manifest) described with reference to FIG. 5 of FIG. 9, for example.

When the data to be copied is determined, the information is sent to the management server 140 and, in Step S714, a payment process according to a sequence prescribed in advance is executed. This process corresponds to the process applied with the payment data 131 shown in FIG. 2.

When the payment process in Step S714 is completed, the procedure goes to Step S715, where the copy authorization information (Permission) is received from the management server 140, which is a receiving process for the copy authorization information 122 shown in FIG. 2.

Subsequently, in Step S716, the information processing apparatus performs the recording process of the copy data with respect to the second medium 150 (see FIG. 2) such as an HDD, an R/RE disc as a copy destination medium.

For reference, at the time of copying process, if the content to be copied is a reproduction-pass-specific content, the decoding process for the content is performed as a process using the segment key acquired in Step S705 in advance and the CPS unit key acquired on the basis of the title information.

In this case, the content decoding process to be reproduced according to the reproduction pass set corresponding to the information processing apparatus described with reference to FIG. 7 is performed.

In contrast, if the content to be copied is the content-code-applied content, the decoding process for the content is performed as a process using the CPS unit key acquired on the basis of the title information.

In the copying process described with reference to the flowcharts shown in FIG. 15 and FIG. 16, the information processing apparatus configured to execute the copying of the content executes an optimal process according to the type of the content recorded in the copy source medium. More specifically, which one of the types (a) to (c) shown below the content recorded in the copy source media (the first medium 110 shown in FIG. 2) belongs to is discriminated.

(a) Content encrypted by the CPS unit key (unit encrypted content)

(b) Content reproduced by selecting a reproduction pass selected by a play list compatible with the information processing apparatus encrypted by the CPS unit key and the segment key (reproduction-pass-specific content)

(c) Content to be subject to the verification or the conversion process using the content code (content-code-applied content)

According to the result of discrimination described above, a process required for each copying process according to the content type is executed to perform the copying process. More specifically, if the content to be copied is (a) Content encrypted by the CPS unit key (unit encrypted content), the following process is performed.

The CPS unit key is acquired by applying the title specification information specified by applying the copying process information (dealManifest) shown in FIG. 5, and the acquired CPS unit key is applied to decode the content to be copied on a CPS unit to CPS unit basis, thereby performing the copying process.

If the content to be copied is the reproduction-pass-specific content, that is, (b) Content reproduced by selecting a reproduction pass selected by a play list compatible with the information processing apparatus encrypted by the CPS unit key and the segment key (reproduction-pass-specific content), the following process is performed.

A CPS unit key is acquired by applying the title specification information specified by applying the copying process information (dealManifest) shown in FIG. 9.

In addition, the SKB process shown in FIG. 8 is executed to acquire a classification number for specifying a play list (identification information which can specify a play list name) for executing the reproduction of the reproduction pass (see FIG. 7) set corresponding to the information processing apparatus. A play list available for the information processing apparatus is acquired by using a play list name recorded in the copying process information (dealManifest) shown in FIG. 9 by using the classification number.

In addition, the copying process is performed by executing the decoding process on the content (AV stream file) specified by the selected play list by using the segment key and the CPS unit key obtained as a result of the SKB process shown in FIG. 8.

At the time of the copying process, the copying process is also executed on the play list and the clip information file specified by the play list.

Also, if the content to be copied is a content-code-applied content:

(c) Content to be subject to the verification or the conversion process using the content code (content-code-applied content), the following process is performed.

Before starting the copying process, the content reproduction process according to the prescribed reproduction sequence is executed, and the verification process or the conversion process using the content code is executed.

Then, the procedure goes to the copying process.

At the time of the copying process, the CPS unit key is acquired by applying the title specification information specified at the time of reproduction by applying the copying process information (dealManifest) shown in FIG. 5 or FIG. 9, and the acquired CPS unit key is applied to decode the content to be copied on a CPS unit to CPS unit basis, thereby performing the copying process.

In this manner, in this embodiment, the copying process is executed according to the process corresponding to the type of the content to be copied. With the process corresponding to the content type, an optimal process according to various contents is performed so that the smooth execution of the copying process is enabled.

[7. An Example of a Configuration of an Information Processing Apparatus]

Finally, an example of the configuration of the information processing apparatus 120 according to an embodiment of the invention will be described with reference to FIG. 17. The information processing apparatus 100 has a configuration which allows the first medium 110 as a recording medium for the content of the copy source and the second medium 150 as a copy destination of the content to be mounted thereon, for example. For reference, the information processing apparatus 120 does not necessarily have to allow the two media to be mounted thereon and, for example, the copy destination media may be configured to output the copy data by being mounted on other devices connected via a USB cable, wireless communication, and the like.

As the first medium 110 and the second medium 150, various types of media (information recording media) such as Blu-ray Discs (registered trademark), DVDs, hard discs, flash memories, for example, are available.

The information processing apparatus 120 includes, as shown in FIG. 17, a data processing unit (control unit) 501, a communicating unit 502, an input unit 503, an output unit 504, a memory 505, a first media interface 506, and a second media interface 507.

The data processing unit 501 is composed of a CPU or the like which has a program execution function for executing various data processing programs. For example, in addition to the data recording and reproduction process, a program for executing the copying process according to respective flowcharts described above is executed. Furthermore, the data processing unit 501 controls general processes executed by the apparatus such as a communication process with the management server 140 via the communicating unit 102.

The communicating unit 502 is used for the communication process with the management server 140, performs request and reception of the copy authorization list including the above-described copying process information (dealManifest), and is further used for the payment process or the receiving process of the copy authorization information (Permission).

The input unit 503 is an operating unit for the user, for example, and performs various inputs such as an input of instructions of data recording or reproduction, or a copy instruction. The input unit 503 also includes a remote controller, and hence allows an input of remote controller operation information. The output unit 504 is an output unit for images and voices composed of a display, a speaker, or the like. The memory 505 is composed of an RAM, an ROM, or the like, and is used as a storage area for programs to be exected by the data processing unit 501, various parameters or received data, and is also used as a buffer area for the copying data.

The first media interface 506 is an interface applied to data recording, reproduction, and copying process using the first medium 110. Data writing, a data reading process, and a data copying process using the first medium 110 are performed according to the request from the data processing unit 501.

The second media interface 507 is an interface applied to data recording, reproducing process, and copying process using the second medium 150. Data writing, a data reading process, and a data copying process using the second medium 150 are performed according to the request from the data processing unit 501.

The invention has been described thus far in detail with reference to specific embodiments. However, it is apparent that those skilled in the art can correct or replace the embodiments without departing the scope of the invention. In other words, the invention has been disclosed in the form of examples, and should not be understood in a limited way. In order to understand the scope of the invention, the section of CLAIMS is to be taken into consideration.

A series of processes described in the specification may be executed by hardware or software, or a composite configuration of the both. The process by the software may be executed by installing a program in which the process sequence is recorded is installed in the memory in the computer built in a specific hardware or by installing the program in a general-purpose computer which can execute various processes. For example, the program may be recorded in advance in the recording medium. The program may be installed in the recording medium such as a built-in hard disc by receiving the program via a network such as LAN (Local Area Network), or internet in addition to being installed in the computer from the recording medium.

Various processes described in the specification is not only executed in time series according to the description, but also may be executed in parallel or individually according to the processing capacity of the apparatus which executes the process or the necessity. In this specification, the term "system" means a logical aggregate configuration of a plurality of apparatuses, and the apparatuses having the respective configurations are not necessarily in the same casing.

INDUSTRIAL APPLICABILITY

As described thus far, according to the configuration of an embodiment of the invention, in the information processing apparatus which performs the copying process for copying the recorded data in the information recording medium to other media or the like, the type of the data recorded in the recording medium of the copy source is identified. More specifically, whether the type of the content to be copied is either a reproduction-pass-specific content which sets a reproduction pass corresponding to the information processing apparatus and causes the information processing apparatus to execute the reproduction according to the reproduction pass, or a content-code-applied content which verifies the reproduction sequence to be executed in the reproducing apparatus and verifies whether the reproduction process is executed according to the correct reproduction sequence is discriminated, and an optimal sequence is applied on the basis of the result of discrimination, whereby the copying process is executed. In this configuration, a reliable copying process on the basis of the optimal process according to various data types is realized.

REFERENCE NUMERALS 110 first medium
111 copy control management file
112 management data
113 encrypted content
120 information processing apparatus
121 copy authorization list
122 copy authorization information
131 payment data
140 management server
141 management data
150 second medium
151 encrypted content
241 media key block (MKB)
242 sequence key block (SKB)
243 segment key file
244 encrypted content
251 device key
252 sequence key file
261 classification number
262 media key variable
401 content code
402 content
403 management data
404 copy control management file
450 display device
501 data processing unit (control unit)
502 communicating unit
503 input unit
504 output unit
505 memory
506 first media interface
507 second media interface

The invention claimed is:

1. An information processing apparatus comprising a data processing unit configured to generate copy data of data recorded in an information recording medium, wherein
the data processing unit
executes a data type identification process for recorded data in the information recording medium, discriminates whether or not the recorded data is a content-code-applied content including code information which causes a verification process for verifying a reproduction process or a conversion process for converting reproduction data to be executed at the time of data reproduction, executes a generation process for generating the copy data after the start of the reproduction process, if it is determined to be the content-code-applied content, and executes the generation process for generating the copy data without executing the reproduction process, if the recorded data is determined to be a non-content-code-applied content which does not include the code information.

2. The information processing apparatus according to claim 1, wherein if the recorded data is determined to be the content-code-applied content, the data processing unit executes the generation process for generating the copy data after the data reproduction process according to a prescribed sequence has started by executing the verification process for verifying the reproduction process or the conversion process for converting the reproduction data applied with the code information.

3. The information processing apparatus according to claim 2, wherein the data processing unit starts the generation process for generating the copy data on the condition that an instruction of execution of copying is input within a data reproduction period after the data reproduction process has started.

4. The information processing apparatus according to claim 1, wherein the data processing unit executes a process for verifying a directory configuration of the recorded data in the information recording medium and executing the process of determining whether or not the recorded data is the content-code-applied content.

5. The information processing apparatus according to claim 4, wherein the verification of the directory configuration is a process of confirming whether there exists a specific directory, or whether a file exists in the specific directory.

6. The information processing apparatus according to claim 1, wherein if the recorded data in the information recording medium is determined to be data encrypted by applying individual unit keys on a unit to unit basis, the unit being segment data corresponding to individual titles in the data type identification process, the data processing unit acquires title information recorded in the copying process information acquired from the information recording medium or a management server, and acquires a unit key corresponding to an acquired title information, executes the decoding process on a unit to unit basis using the acquired unit key, and generates the copy data.

7. The information processing apparatus according to claim 6, wherein the data processing unit discriminates whether or not the recorded data in the information recording medium is the reproduction-pass-specific content for performing the reproduction according to the reproduction pass selected corresponding to the information processing apparatus in the data type identification process, and if the recorded data is determined to be the reproduction-pass-specific content, generates a segment key applied for decoding part of a configuration data of the reproduction pass and generates the copy data by the decoding process using the generated segment key and the unit key.

8. The information processing apparatus according to claim 7, wherein the data processing unit acquires identification information for identifying a play list which allows reproduction according to the reproduction pass by a process applying a sequence key stored in a memory of the information processing apparatus to a sequence key block reproduced from the information recording medium, reads out a play list file corresponding to the reproduction pass by applying the acquired identification information from the information recording medium and executes the data reading according to the reproduction pass by applying the play list.

9. The information processing apparatus according to claim 7 or 8, wherein the data processing unit acquires a classification number by a process using the sequence key stored in the memory of the information processing apparatus with respect to the sequence key block reproduced from the information recording medium, acquires identification information for identifying the play list using the classification number, and acquires a segment key corresponding to a specific variation in the segment from a segment key file including an encryption key obtained by encrypting the key for decoding the data according to the reproduction pass.

10. An information processing system comprising:

an information processing apparatus configured to generate copy data of data recorded in an information recording medium; and a management server configured to provide copy authorization information with respect to the information processing apparatus, wherein the information recording medium is configured to record data encrypted by applying individual unit keys on a unit to unit basis, the unit being segment data corresponding to individual titles, the management server provides copying process information in which the identification of the title is recorded to the information processing apparatus according to the request from the information processing apparatus, the information processing apparatus executes a data type identification process for recorded data in the information recording medium, if the recorded data is determined to be data encrypted by applying individual unit keys on a unit to unit basis, the unit being a segment data corresponding to individual titles, acquires title information recorded in the copying process information acquired from the management server, and acquires a unit key corresponding to the acquired title information, and executes the decoding process on a unit to unit basis using the acquired unit key.

11. An information processing method configured to generate copy data of data recorded in an information recording medium in an information processing apparatus, wherein a data processing unit of the information processing apparatus executes a data type identification process for recorded data in the information recording medium, discriminates whether or not the recorded data is a content-code-applied content including code information which causes a verification process for verifying a reproduction process or a conversion process for converting reproduction data to be executed at the time of data reproduction, executes a generation process for generating the copy data after the start of the reproduction process, if it is determined to be the content-code-applied content, and executes the generation process for generating the copy data without executing the reproduction process, if the recorded data is determined to be a non-content-code-applied content which does not include the code information.

12. A non-transitory computer readable storage medium storing a program, which when executed by an information processing apparatus, generates copy data of data recorded in an information recording medium in the information processing apparatus, and causes a data processing unit of the information processing apparatus to execute a step of executing a data type identification process for recorded data in the information recording medium, a step of discriminating whether or not the recorded data is a content-code-applied content including code information which causes a verification process for verifying a reproduction process or a conversion process for converting reproducing data to be executed at the time of data reproduction, a step of executing a generation process for generating the copy data after the start of the reproduction process, if it is determined to be the content-code-applied content, and a step of executing the generation process for generating the copy data without executing the reproduction process, if the recorded data is determined to be a non-content-code-applied content which does not include the code information.

* * * * *